United States Patent
Yamamoto et al.

(10) Patent No.: US 7,358,031 B2
(45) Date of Patent: Apr. 15, 2008

(54) OPTICAL INFORMATION RECORDING MEDIUM, OPTICAL INFORMATION RECORDING DEVICE AND MANUFACTURING METHOD OF OPTICAL INFORMATION MEDIUM

(75) Inventors: Hiroki Yamamoto, Hitachi (JP); Takashi Naito, Mito (JP); Toshimichi Shintani, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 541 days.

(21) Appl. No.: 10/804,098

(22) Filed: Mar. 19, 2004

(65) Prior Publication Data
US 2005/0003302 A1  Jan. 6, 2005

(30) Foreign Application Priority Data
Jul. 1, 2003  (JP) ............................. 2003-189501

(51) Int. Cl.
G11B 7/24  (2006.01)
(52) U.S. Cl. ................ 430/270.13; 430/945; 428/64.4; 369/275.2; 369/284
(58) Field of Classification Search ............... None
See application file for complete search history.

(56) References Cited

U.S. PATENT DOCUMENTS

| | | | | |
|---|---|---|---|---|
| 4,905,215 A | * | 2/1990 | Hattori et al. ................. 369/14 |
| 5,001,690 A | * | 3/1991 | Kamiya et al. ............ 369/44.32 |
| 5,470,628 A | * | 11/1995 | Tominaga et al. .......... 428/64.4 |
| 6,524,766 B1 | | 2/2003 | Ariyoshi et al. |
| 6,660,451 B1 | * | 12/2003 | Sakaue et al. ......... 430/270.13 |
| 6,896,946 B2 | * | 5/2005 | Chen ........................ 428/64.1 |
| 7,041,430 B2 | * | 5/2006 | Miyamoto et al. ..... 430/270.13 |
| 7,063,876 B2 | * | 6/2006 | Nishihara et al. .......... 428/64.1 |
| 2002/0041564 A1 | * | 4/2002 | Yoshinari et al. ........ 369/275.3 |
| 2003/0039200 A1 | * | 2/2003 | Shintani et al. .......... 369/275.1 |
| 2004/0085882 A1 | * | 5/2004 | Yamamoto et al. ........... 369/94 |
| 2004/0219455 A1 | * | 11/2004 | Tseng et al. ............ 430/270.11 |
| 2005/0207322 A1 | * | 9/2005 | Chen ...................... 369/275.2 |

FOREIGN PATENT DOCUMENTS

EP  0 810 590  * 12/1997
JP  03091128  * 4/1991

OTHER PUBLICATIONS

Hiroki Yamamoto et al., "Nonlinear change of refractive index of CO3O4 thin films induced by semiconductor laser irradiation", Applied Physics Letters, vol. 81, No. 6, pp. 999-1001, Aug 5, 2002.

* cited by examiner

Primary Examiner—Mark F. Huff
Assistant Examiner—Anna L Verderame
(74) Attorney, Agent, or Firm—Antonelli, Terry, Stout & Kraus, LLP.

(57) ABSTRACT

A multilayer optical information recording medium includes optical information recording layers, and dielectric multilayer reflecting layers provided under the optical information recording layers respectively. Each of the dielectric multilayer reflecting layers includes: a laminate of low refractive index films and high refractive index films; and a variable refractive index film exhibiting change of refractive index induced by laser beam irradiation. Each of the dielectric multilayer reflecting layers is provided so that reflectance of a portion used for reading/writing information by condensed laser beam irradiation is high while transmittance of the other portion is high. It is possible to reduce intensity of laser beam to be irradiated to the medium.

18 Claims, 12 Drawing Sheets

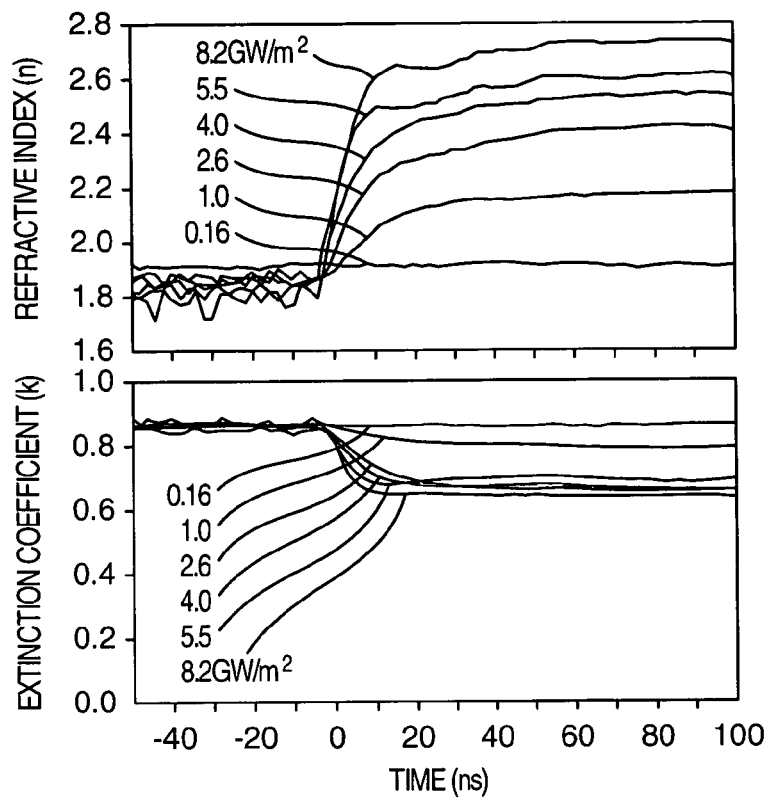
FIG.4A
FIG.4B
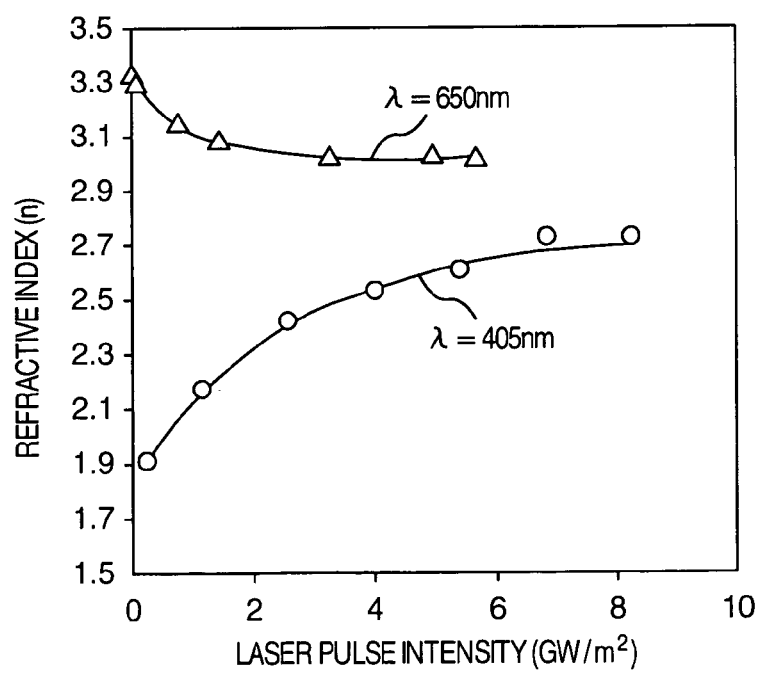
FIG.5

OPTICAL INFORMATION RECORDING MEDIUM, OPTICAL INFORMATION RECORDING DEVICE AND MANUFACTURING METHOD OF OPTICAL INFORMATION MEDIUM

BACKGROUND OF THE INVENTION

1. Field of the Invention

The present invention relates to an optical information recording medium having at least two optical information recording layers and particularly relates to a large-capacity optical information recording medium having dielectric multilayer reflecting layers having variable reflectance, an optical information recording medium manufacturing method adapted for formation of the dielectric multilayer reflecting layers and an optical information recording device adapted for recording/reproduction of information in/from the medium.

2. Description of the Related Art

Change of the refractive index of an optical information recording medium has been disclosed in Hiroki Yamamoto et al., "Nonlinear change of refractive index of $Co_3O_4$ thin films induced by semiconductor laser ($\lambda$=405 nm) irradiation", Applied Physics Letters, volume 81, number 61, pp. 999-1001.

Construction of a communication system allowing high-speed communication of a large amount of information has been demanded with the recent development of information society using optical communication. An optical information recording medium for storing a large amount of optical information exemplifies an optical device essential for development of such large-volume high-speed optical communication. With the advance of digitalization of video information such as television pictures and improvement in image quality such as high definition, development of a large-capacity optical information recording medium allowing long-time recording while maintaining the high image quality state has been demanded urgently.

For the time being, a DVD having a capacity of 4.7 GB on single side has been put into practical use as an optical information recording medium and has been widespread as a medium for storing a large amount of animation information such as video, in addition to use in a computer. The DVD has been put into practical use not only as a read-only ROM (DVD-ROM) having a substrate in which information has been already written directly, but also as a rewritable recording/reproduction medium.

Development has been made in order to improve recording density of this type optical information recording medium. A laser beam with a wavelength of 650 nm shorter than the laser (780 nm) used for a CD or the like has been used as a means for attaining high density recording of information. In order to handle a large amount of information for computer graphics, digital high definition video, etc., it is however necessary to attain recording density increased by 4 times or 5 times as high as the recording density obtained by the 650 nm laser beam. In order to attain such high recording density, an optical disk using a blue semiconductor laser with a shorter wavelength (405 nm) has been developed to promote practical use of an optical disk having a capacity of 27 GB on single side.

Multilayer recording, multivalue recording, super resolution recording, etc. have been developed as techniques for increasing the capacity of an optical disk. Among the next generation techniques for increasing the capacity, multilayer recording is the most leading technique.

The multilayer recoding, however, has a problem that a very high power laser is required because light is absorbed to an optical recording layer present in the front with respect to a direction of incidence of the light so that intensity of the light reaching a recording layer present in the rear is lowered. In addition, the multilayer recording has another problem that crosstalk occurs easily because information is detected as a signal from other layers than a layer currently used for reading information.

In order to solve the problems, JP-A-2002-15464 has disclosed a method for improving transmittance by provision of a semi-transparent reflecting layer, and JP-A-2002-117585 has disclosed a method for decreasing crosstalk from other layers than a layer currently used for reading information by multiplexing of wavelength and provision of a filter in front of each recording layer.

SUMMARY OF THE INVENTION

In the method described in JP-A-2002-15464, the quantity of light reflected from each layer is however insufficient and transmittance to the second layer is insufficient because of semi-transparency. In the method described in JP-A-2002-117585, it is difficult to simplify the drive system because laser beams with a plurality of wavelengths are required. An object of the present invention is to provide a recording medium permitting low-crosstalk high-S/N optical information recording without increase in laser oscillation power.

It is possible to provide an optical information recording medium having a substrate, and a plurality of optical information recording layer units formed on the substrate with interposition of at least one transparent intermediate layer, each of the optical information recording layer units including an optical recording layer for recording an optical signal, and a dielectric multilayer reflecting layer laminated on the optical recording layer directly or through another film, wherein each of the dielectric multilayer reflecting layers has: a dielectric multilayer film formed as a repetitive laminate of low refractive index thin films and high refractive index thin films; and a variable refractive index thin film formed in the dielectric multilayer film and exhibiting nonlinear change of its complex refractive index induced by light irradiation.

Preferably, each of the dielectric multilayer reflecting layers has a dielectric multilayer film formed as a repetitive laminate of low refractive index thin films and high refractive index thin films, and a variable refractive index thin film formed in the dielectric multilayer film and exhibiting nonlinear change of its complex refractive index induced by light irradiation. Preferably, reflectance of a portion of an optical information recording layer unit used for reading/writing information by focused laser beam irradiation is higher than that of the other portion of the optical information recording layer unit.

The configuration of each of the optical recording layers in the recording medium according to the present invention is as follows.

(1) At least two optical recording layers are provided in order to increase the recording capacity of one disk. The number of recording layers is optionally selected to be in a range of from 2 to 10. Generally, protective layers are provided on opposite surfaces of each recording layer.

(2) A photonic crystal or dielectric multilayer film made of an alternate laminate of low refractive index films and high refractive index films is disposed on a side of each optical recording layer opposite to a light source used for recording/reading information (i.e., on a side of each optical recording layer far from the light source). The total number of films in each dielectric multilayer film is selected to be preferably not smaller than 9, especially preferably not smaller than 13. The dielectric multilayer films and the recording layers are laminated alternately so as to be arranged successively with respect to the light source.

(3) A variable refractive index thin film exhibiting nonlinear reversible change of its complex refractive index is interposed in each dielectric multilayer film. The refractive index of the variable refractive index thin film changes according to the intensity of irradiation light such as a laser beam, so that the variable refractive index thin film changes into either transmissive film or reflective film. When, for example, light with a specific wavelength is used for reading/writing information from/in the first recording layer, the variable refractive index thin film included in the dielectric multilayer film for the first recording layer is transparent but the refractive index of the variable refractive index thin film included in each of the dielectric multilayer films for the second and third recording layers changes so that the variable refractive index thin film serves as a reflective film with respect to the light with the specific wavelength. For this reason, crosstalk among the recording layers can be prevented. In addition, information can be read/written at high S/N because the aforementioned function can prevent crosstalk without increase in laser power. Incidentally, in the present invention, a combination of a dielectric multilayer film described in the paragraph (2) and a variable refractive index thin film described in the paragraph (3) is referred to as "dielectric multilayer reflecting layer".

(4) A transparent intermediate layer is interposed between adjacent ones of the units each including the recording layer, the dielectric multilayer film and the variable refractive index thin film. A cover layer is formed as the outermost layer of the disk. The dielectric multilayer reflecting layer formed in each information recording layer unit is provided so that a reflectance difference $\Delta R$ ($=R_2-R_1$) between reflectance $R_2$ of a portion used for reading/writing information by condensed laser beam irradiation and reflectance $R_1$, of the other portion is not smaller than 0.8. In addition, in the dielectric multilayer reflecting layer, the ratio $n_1/n_2$ of the refractive index $n_1$ of each low refractive index thin film to the refractive index $n_2$ of each high refractive index thin film is not higher than 0.80.

The product $n_1 d_1$ of refractive index $n_1$ and film thickness $d_1$ of each low refractive index thin film is preferably in a range of from 0.15 times to 0.35 times as large as the wavelength of the laser beam used for reading/writing information. Similarly, the product $n_2 d_2$ of refractive index $n_2$ and film thickness $d_2$ of each high refractive index thin film is preferably in a range of from 0.15 times to 0.35 times as large as the wavelength of the laser beam used for reading/writing information.

The variable refractive index thin film in each dielectric multilayer reflecting layer is a thin film containing particles of at least one element selected from the group consisting of Co, Fe, Ni, V, Mn, Cr, Cd, Zn, Cu, Ag, Pt and Au, or particles of oxide, nitride or sulfide of the selected element. The low refractive index thin films are thin films preferably made of $SiO_2$. The high refractive index thin films are thin films made of at least one member selected from the group consisting of $TiO_2$, $ZnS-SiO_2$, $Si_3N_4$ and $Ta_2O_5$.

Preferably, each intermediate layer in the optical information recording medium according to the present invention is made of an amorphous dielectric thin film. The film thickness of each intermediate layer is preferably selected to be in a range of from 0.3 μm to 3 μm, both inclusively.

The present invention also provides a method of manufacturing an optical information recording medium, including the steps of: forming a dielectric multilayer reflecting layer on a substrate by a chemical vapor deposition method; forming a variable refractive index thin film by a sputtering method; forming protective layers and an optical recording layer; and forming a number of recording layers by repeating the aforementioned steps, wherein a multilayer structure is formed by the chemical vapor deposition method carried out in such a manner that a source gas put in a vacuum chamber is replaced by a new one alternately. The substrate rotates on its own axis and revolves around a certain axis when film formation is performed by the chemical vapor deposition method or the sputter method.

The present invention further provides an optical information recording device at least including a pickup for reading/writing optical information from/in an optical information recording medium, and a spindle and a spindle motor for giving rotation drive to the optical information recording medium while supporting the optical information recording medium, wherein the pickup includes an auto focusing mechanism, and a laser beam irradiation angle keeping mechanism which is used together with the auto focusing mechanism so that an optical axis of a laser beam emitted from the pickup can be automatically kept perpendicular to the optical information recording medium when the optical information recording medium tilts.

The laser beam irradiation angle keeping mechanism receives an input signal for indicating an intensity distribution of the laser beam and controls the angle of the pickup in accordance with the input signal to thereby keep the laser beam irradiation angle constant. The optical information recording medium includes at least two optical information recording layer units. Each optical information recording layer unit has a dielectric multilayer reflecting layer. The dielectric multilayer reflecting layer has: a dielectric multilayer film formed as a repetitive laminate of low refractive index thin films and high refractive index thin films; and a variable refractive index thin film formed in the dielectric multilayer film and exhibiting nonlinear change of its complex refractive index induced by light irradiation.

BRIEF DESCRIPTION OF THE DRAWINGS

FIG. 4A is a graph showing change (with time) of refractive index induced by pulse light irradiation and measured by the evaluation optical system depicted in FIG. 3;

FIG. 4B is a graph showing change (with time) of extinction coefficient induced by pulse light irradiation and measured by the evaluation optical system depicted in FIG. 3;

FIG. 5 is a graph showing the relation between laser pulse intensity and refractive index shown in FIG. 4A;

DESCRIPTION OF THE INVENTION

The present invention will be described below in detail in conjunction with embodiments thereof.

Embodiment 1

Figure 1:
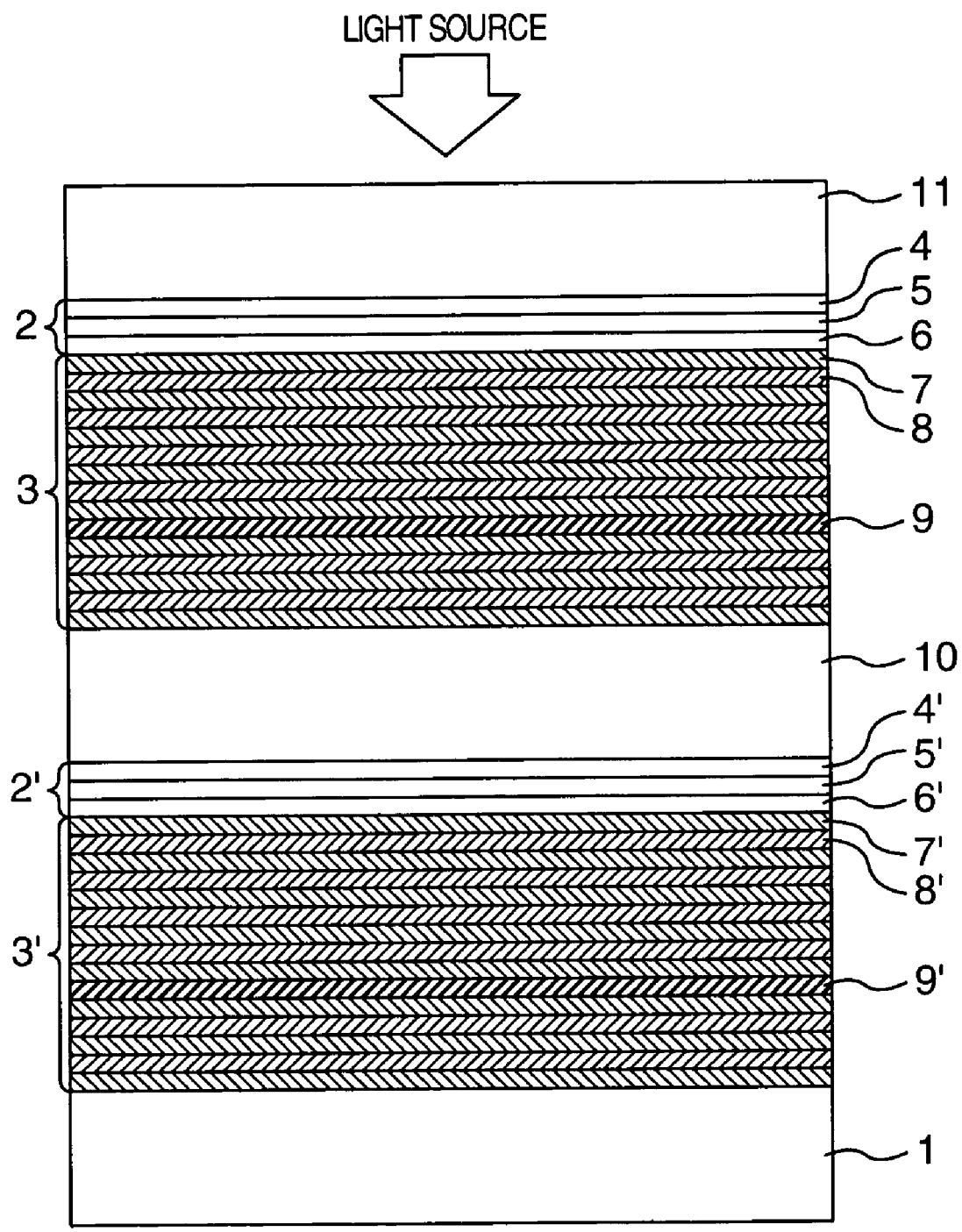
FIG. 1 is a typical view of a two-layer recording medium produced according to an embodiment of the present invention.

FIG. 1 is a sectional structural view of an optical information recording medium having a two-layer structure of readable/erasable optical recording layers produced according to the present invention. In FIG. 1, the reference numeral 1 designates a substrate; 2, a first optical information recording layer; 3, a dielectric multilayer reflecting layer; 2', a second optical information recording layer; and 3', a dielectric multilayer reflecting layer. The dielectric multilayer reflecting layer 3 is provided under the first optical information recording layer 2 when viewed from a light source. The dielectric multilayer reflecting layer 3' is provided under the second optical information recording layer 2'. The combination of the second optical information recording layer 2' and the dielectric multilayer reflecting layer 3' is provided under the combination of the first optical information recording layer 2 and the dielectric multilayer reflecting layer 3 when viewed from the light source.

The optical information recording layer 2 is composed of an optical recording film 5 and protective films 4 and 6. The dielectric multilayer reflecting layer 3 is composed of low refractive index films 7, high refractive index films 8 and a variable refractive index film 9. As shown in FIG. 1, the variable refractive index film 9 is a thin film formed in a repetitive cyclic structure of the low refractive index films 7 and high refractive index films 8.

The layer made of a laminate having such a cyclic structure of dielectric films (7 and 8) different in refractive index or extinction coefficient is generally called "one-dimensional photonic crystal" or "dielectric multilayer film".

An intermediate layer 10 having a thickness of 100 nm to 1 μm is formed between the first optical information recording layer 2, 3 and the second optical information recording layer 2', 3' to shift the light focusing point to thereby prevent the two optical information recording layers from being used simultaneously for reading/writing information. A cover layer 11 is formed on the first optical information recording layer 2 when viewed from the direction of incidence of a laser beam. The laser beam used for reading/writing information is incident onto the cover layer 11. After the laser beam is transmitted through the respective layers or reflected by interfaces between the respective layers, the laser beam enters a photo detector not shown in FIG. 1. In this embodiment, a semiconductor laser beam with a wavelength of 405 nm was used as the incident laser beam in the experiment.

In this embodiment, a polycarbonate substrate having a thickness of 1.1 mm and a diameter of 120 mm was used as the substrate 1. A hole having an inner diameter of 15 mmφ is formed in the substrate so that the substrate can be chucked. A thin film made of $80ZnS-20SiO_2$ (containing 80% by mole of ZnS, and 20% by mole of $SiO_2$) was used as each of the protective films 4 and 6. The film thickness of each protective film was adjusted to increase reflectance optically. In this embodiment, the film thickness of each protective film was selected to be in a range of from 20 nm to 100 nm. A 10 nm-thick recording layer made of 10Ge-70Sb-20Te (containing 10% by mole of Ge, 70% by mole of Sb, and 20% by mole of Te) is formed as the optical recording film 5.

$SiO_2$ was used as the thin film material of the low refractive index films 7 which are constituent parts of the dielectric multilayer reflecting layer 3. One member selected from the group consisting of $80ZnS-20SiO_2$ (containing 80% by mole of ZnS, and 20% by mole of $SiO_2$), $TiO_2$, $Si_3N_4$ and $Ta_2O_5$ is used as the film material of the high refractive index films 8 which are constituent parts of the dielectric multilayer reflecting layer 3. When these materials are used, the ratio $n_1/n_2$ of the refractive index $n_1$ of each low refractive index film to the refractive index $n_2$ of each high refractive index film can be selected to be not larger than 0.80. When materials are selected to obtain such a large refractive index ratio, the dielectric multilayer reflecting layer can be formed efficiently in spite of reduction in total number of laminated films.

To produce a dielectric multilayer reflecting layer exhibiting a large reflectance ratio at a desired wavelength, the product of refractive index and reflectance of each film is preferably selected to be about one fourth as large as the wavelength used. When the wavelength of the laser beam used is 405 nm, the film thicknesses of the respective refractive index films 7 and 8 are selected as follows. Since the refractive index of $SiO_2$ as the material of the low refractive index films 7 is 1.48, the film thickness of each low refractive index film 7 was selected to be 58 nm. Since the refractive index of 80ZnS-20$SiO_2$ is 2.56 when 80ZnS-20$SiO_2$ is selected as the material of the high refractive index films 8, the film thickness of each high refractive index film 8 is selected to be 37 nm. 70 nm-thick cobalt oxide $Co_3O_4$ is formed as the variable refractive index film 9. FIG. 1 shows the case where the low refractive index films 7 and the high refractive index films 8 are laminated alternately, the variable refractive index film 9 is then formed, and the low refractive index films 7 and the high refractive index films 8 are further laminated alternately as nine layers.

The optical information recording layers each including the aforementioned dielectric multilayer reflecting layer as a reflective layer were formed successively on the substrate in order of increasing distance from the substrate in the multilayer thin film structure shown in FIG. 1. That is, after the second multilayer reflecting layer 3' and the second recording layer 2' nearer to the substrate are formed, the intermediate layer 10 is formed. In this embodiment, an $SiO_2$ thin film with a thickness of 400 nm to 10 μm was formed as the intermediate layer. Then, the first dielectric multilayer reflecting layer 3 and the first recording layer 2 are laminated in the same manner as described above. Thus, the two-layer optical recording medium was produced.

In this embodiment, all the films were formed by a sputtering method or a CVD (Chemical Vapor Deposition) method. Target materials which are the same in composition as the respective materials of the thin films were arranged as sputtering targets. In this embodiment, the laminated structure was produced in such an automatic programming manner that thicknesses of the films are controlled while four targets are disposed in a sputter chamber successively because four kinds of materials, that is, $SiO_2$, 80ZnS-20$SiO_2$, $Co_3O_4$ and 10Ge-70Sb-20Te were used for forming a disk.

The optical recording film 5 is formed by a DC magnetron sputtering method while the other films are formed by an RF magnetron sputtering method. For formation of each film, argon gas is used as a sputtering gas with a gas pressure set at about 0.7 Pa. Each film is formed in such a manner that the substrate is rotated on its own axis and revolved around the center of a rotary substrate holder 304 (shown in FIG. 18 or 19, described later) while power of 0.2 kW to 1 kW is applied to a corresponding target with a size of 152.4 mmφ.

Figure 18:
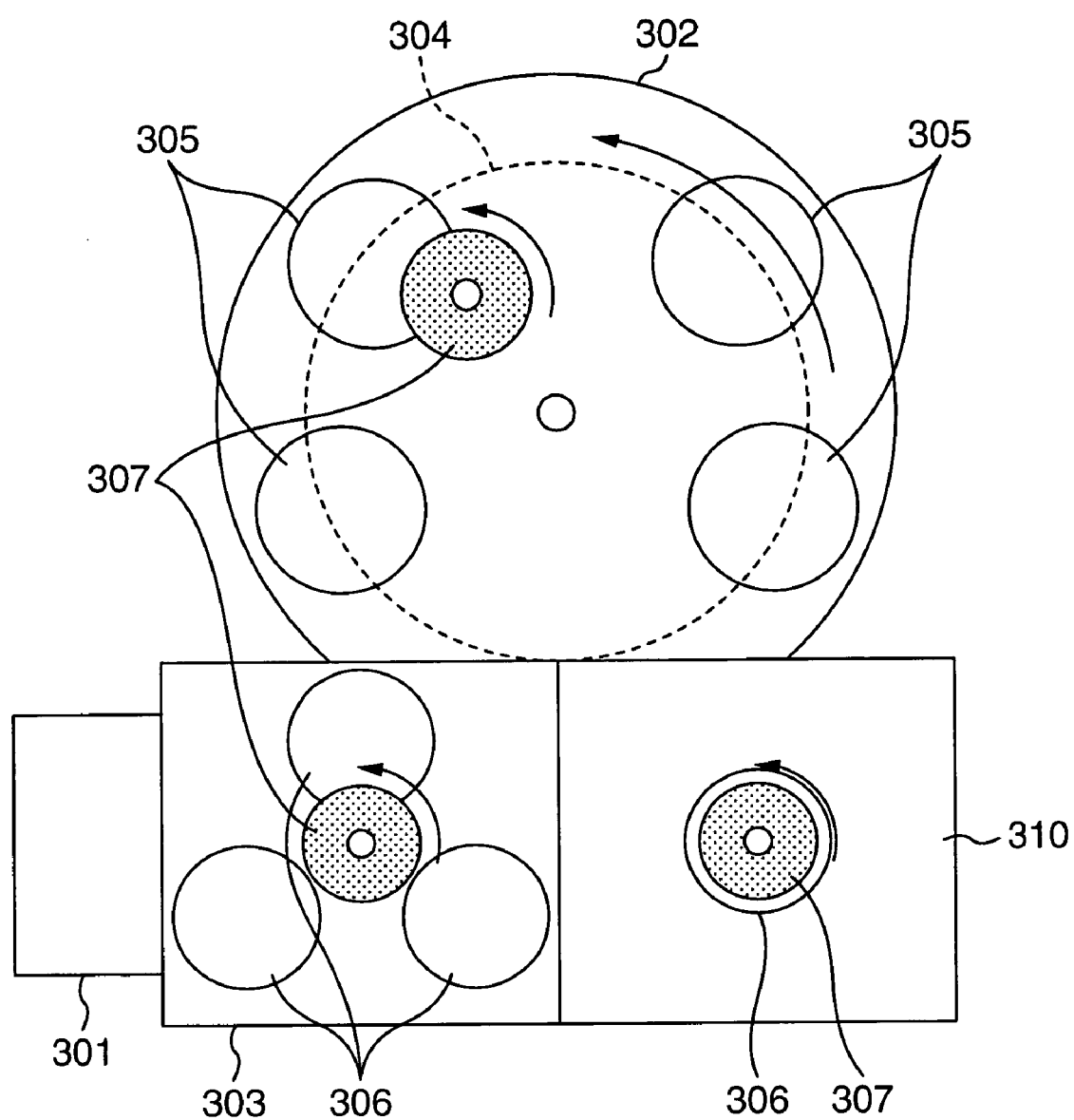
FIG. 18 is a typical structural view of a film-forming apparatus used for producing a multilayer optical recording medium according to the present invention.
Figure 19:
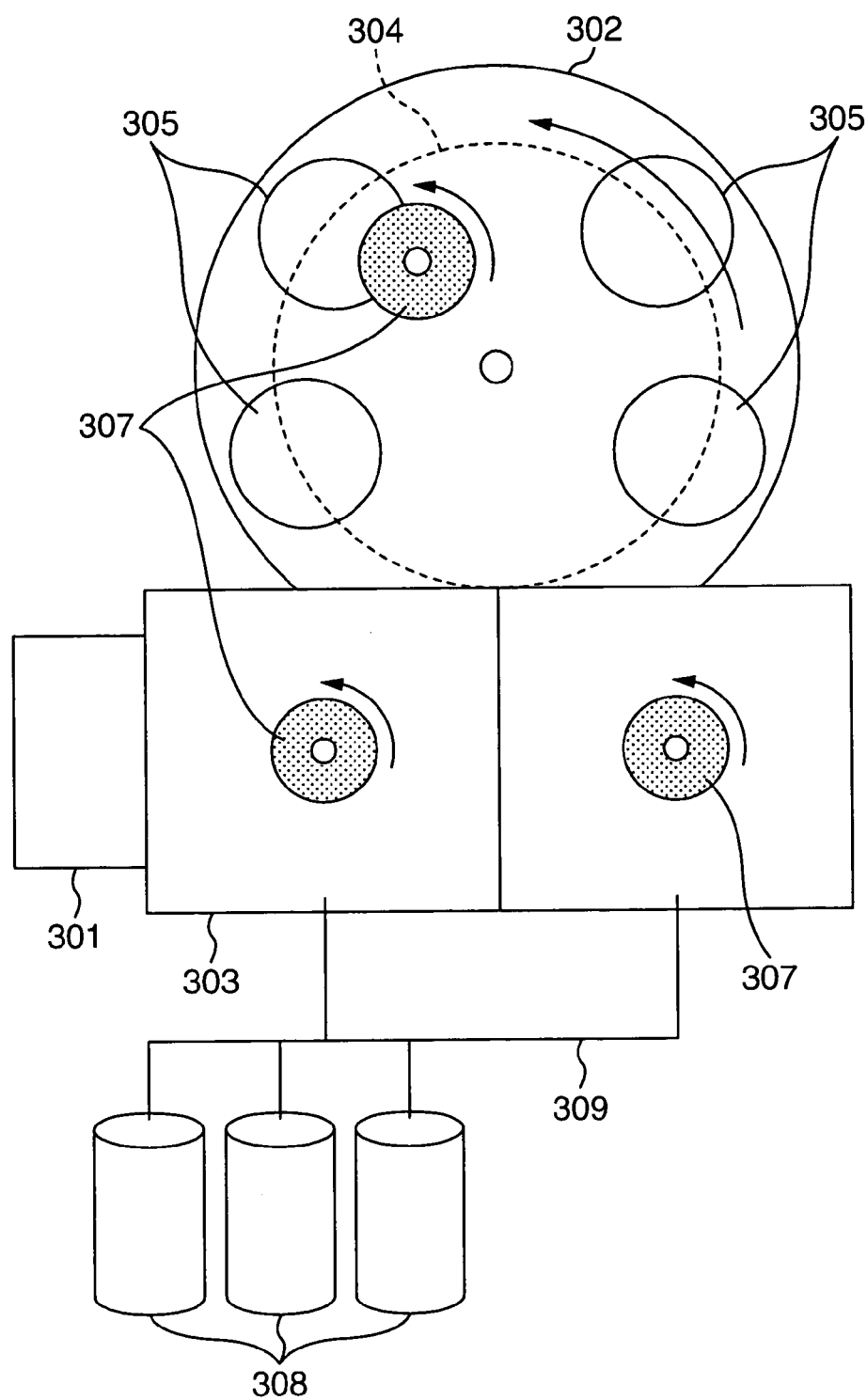
FIG. 19 is a typical structural view of a film-forming apparatus used for producing a multilayer optical recording medium by a chemical vapor deposition method according to the present invention.

In this embodiment, a film-forming apparatus provided with a dielectric multilayer reflecting layer-forming chamber as shown in FIG. 18 or 19 was further produced so that the dielectric multilayer reflecting layer can be produced more efficiently. FIG. 18 or 19 shows the external appearance of the produced film-forming apparatus. FIG. 18 is a view of an apparatus of the type having a dielectric multilayer reflecting layer-forming portion using a sputtering method. FIG. 19 is a view of an apparatus of the type using a CVD (Chemical Vapor Deposition) method. In FIG. 18, the reference numeral 301 designates a load lock chamber for introduction of a substrate; 302, a sputter film-forming chamber; 303, a dielectric multilayer reflecting layer-forming chamber; 304, a rotary substrate holder for carrying the substrate onto respective targets; 305, a target for forming a protecting film, a recording film or the like; 306, a target for forming a dielectric multilayer reflecting layer or an intermediate layer; and 307, an optical disk substrate.

The reference numeral 310 designates an intermediate layer-forming chamber. In FIG. 19, the reference numeral 308 designates a raw material supply source for forming a dielectric multilayer reflecting layer; and 309, an introduction pipe for introducing the raw material into the dielectric multilayer reflecting layer-forming chamber 303.

The substrate is introduced from the load lock chamber 301 into the dielectric multilayer reflecting layer-forming chamber 303. In the chamber 303, while the substrate is rotated on its own axis, the respective targets generate electric discharge sequentially for a predetermined time so that a desired laminate can be formed from low refractive index films, high refractive index films and a variable refractive index film. In this manner, the laminate is formed. Then, the substrate is supplied into the sputter film-forming chamber 302. In the chamber 302, a recording layer is formed on the laminate. Then, the substrate is supplied into the intermediate layer-forming chamber 310. In the chamber 310, an intermediate layer is formed on the resulting laminate.

FIG. 19 shows the type using CVD as a dielectric multilayer reflecting layer-forming method. In FIG. 19, desired raw materials are introduced from the raw material supply source 308 in accordance with a film-forming sequence and deposited on a substrate. Either sputtering or CVD may be used in the intermediate layer-forming chamber. After formation of the intermediate layer, the substrate is further introduced into the dielectric multilayer reflecting layer-forming chamber 303 and the sputter film-forming chamber 302 as a thin film-forming chamber to form the second optical recording layer.

When the aforementioned film-forming apparatus is used, a film-forming chamber for forming a protective film, a recording film, etc. by ordinary sputtering and film-forming chambers for forming a dielectric multilayer reflecting layer and an intermediate layer can be provided separately. Moreover, the film-forming chambers can be disposed circularly. Accordingly, a laminate could be formed efficiently. In addition, a large number of multilayer recording layers can be formed theoretically because these film-forming chambers can be disposed circularly.

Since the CVD method is used in the dielectric multilayer reflecting layer-forming portion and the intermediate layer-forming portion, film formation could be made speedily compared with the sputtering method. Accordingly, film formation can be made more efficiently because the CVD method is used. Any raw material may be used in the CVD method as long as it is a gas or liquid material containing $SiO_2$ for forming the low refractive index films, one member selected from the group consisting of $Ta_2O_5$, ZnS—$SiO_2$, $TiO_2$, and $Si_3N_4$ for forming the high refractive index films, $Co_3O_4$ or ZnO for forming the variable refractive index film, and so on.

After these layers are formed, a polycarbonate sheet having an outer diameter of 120 mmφ, an inner diameter of 15 mmφ and a thickness of 0.1 mm was stuck as the cover layer 11 thereto. That is, after an ultraviolet-curable adhesive agent is applied, by spin coating, onto the substrate material having these layers already formed, the polycarbonate sheet was put as the cover layer 11 thereon from above. After the substrate and the sheet are evenly pressed against each other, the sheet was stuck to the substrate without interposition of air bubbles by ultraviolet irradiation. In order to eliminate positional displacement of the sheet relative to the substrate, a positioning pole with an outer diameter of 15 mmφ is erected in the inner diameter portion of the substrate. The substrate is set with the pole as a guide. The cover layer 11 is also set with the pole as a guide. In this condition, the substrate and the cover layer are pressed evenly from above and stuck to each other.

Figure 2:
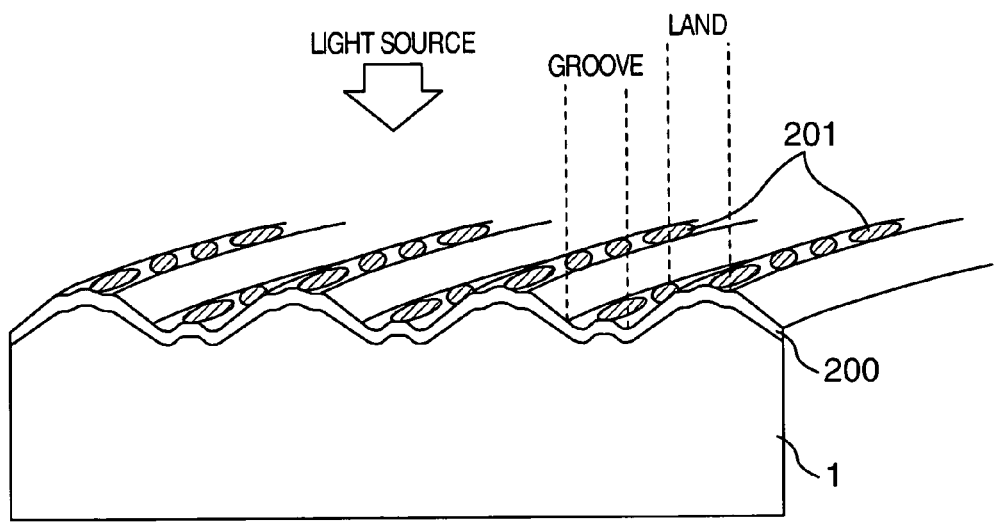
FIG. 2 is a perspective view of the two-layer recording medium produced according to the embodiment of the present invention.

FIG. 2 is a perspective view showing a section of the optical disk. In FIG. 2, the reference numeral 1 designates a substrate; 200, a two-layer optical recording layer composed of films 2 to 11 shown in FIG. 1; and 201, a recording pattern with information recorded. As shown in FIG. 2, the optical disk examined in this embodiment has a land-groove structure in which information is recorded in land portions and groove portions.

A semiconductor laser beam with a wavelength of 405 nm is condensed by a condensing lens with a numerical aperture of 0.85, so that the laminate is irradiated with the condensed laser beam from the film-forming surface side to thereby record, reproduce or erase optical information. In this condition, properties of the optical disk were evaluated.

In the optical information recording medium according to the present invention, the refractive index and extinction coefficient of the variable refractive index film 9 in each dielectric multilayer reflecting layer reversibly change in accordance with light intensity at the time of laser beam irradiation. First, change of the refractive index of a variable refractive index film 9 induced by laser beam irradiation is obtained in the case where the variable refractive index film 9 is used as a single layer. The obtained result is shown in FIGS. 4A and 4B and FIGS. 5 and 6. Incidentally, data shown in FIGS. 4A and 4B and FIGS. 5 and 6 have been described by the present inventors in the publication issued in August 2002 (Applied Physics Letters, volume 81, number 6, pp. 999-1001). The data are cited from the publication to explain part of the phenomenon used by the present invention.

Figure 3:
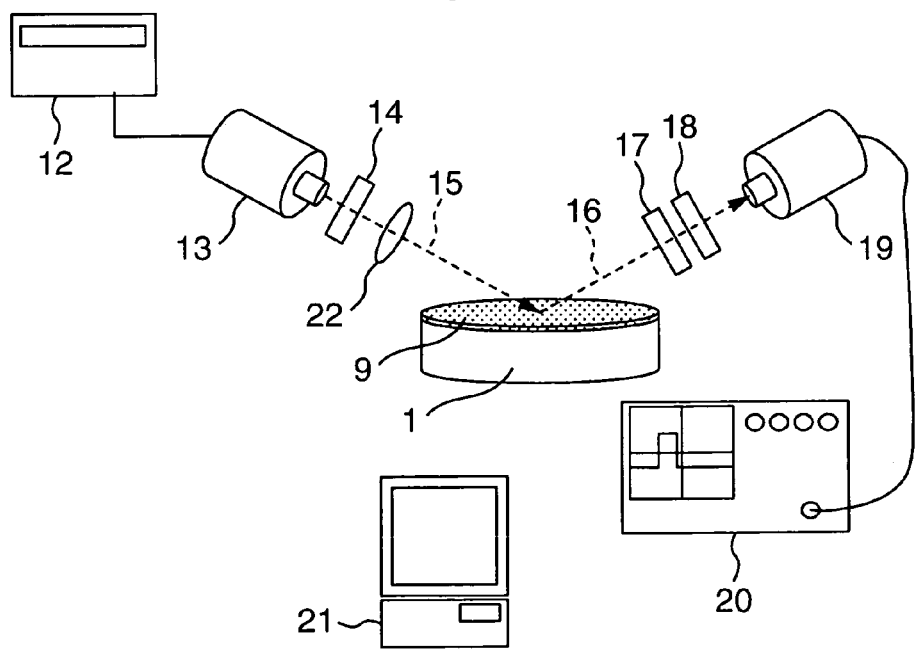
FIG. 3 is a typical view of an optical system for evaluating a nonlinear optical thin film according to the present invention.

FIG. 3 is a typical view of an ellipsometer used for measuring change of the refractive index and extinction coefficient. In FIG. 3, the reference numeral 1 designates a substrate; 9, a variable refractive index film; 12, a pulse generator; 13, a light source; 14, a polarizer; 15, incident light; 16, reflected light; 17, an analyzer; 18, a filter; 19, a photo detector; 20, a digital oscilloscope; 21, a control computer; and 22, a focusing lens. A semiconductor laser with a wavelength of 650 nm or 405 nm was used as the light source 13.

The pulse generator 12 was used so that the laser beam was set as pulse light emitted with desired intensity for a predetermined time. The pulse light was polarized by the polarizer 14 so as to be separated into light (s-polarized light) having its vibration surface parallel to the surface of the sample and light (p-polarized light) having its vibration surface perpendicular to the surface of the sample. The laser beam was focused onto the surface of the sample by the focusing lens 22. On this occasion, when the wavelength was 650 nm, the laser diameter of the focusing portion was 0.9 μm. On the other hand, when the wavelength is 405 nm, the laser diameter of the focusing portion is 0.6 μm.

When the sample is irradiated with such polarized light, reflectance and phase for the s-polarized light are different from those for the p-polarized light in accordance with the film thickness, refractive index, and extinction coefficient of the sample. Accordingly, when the reflectance ratio between the s-polarized light and the p-polarized light and the phases of the s-polarized light and the p-polarized light are obtained in the condition that the film thickness of the sample is measured in advance, the refractive index and extinction coefficient of the sample can be estimated. Generally, the real part of a complex refractive index expresses a refractive index, and the imaginary part of the complex refractive index expresses an extinction coefficient. The refractive index and extinction coefficient are parameters concerning light absorption of a material.

The analyzer 17 is located on the photo detection side of reflected light. While the angle of the analyzer is rotated, the reflectance ratio between s-polarized light and p-polarized light and phases of the s-polarized light and the p-polarized light were obtained on the basis of the intensity of reflected light obtained in accordance with the angle of the analyzer. Measurement was performed at respective angles of the analyzer obtained by dividing one rotation of the analyzer into 12 parts. Since proper analysis cannot be made when larger intensity of light than allowable intensity is incident onto the photo detector, the filter 18 was placed in accordance with intensity of pulse light to adjust the intensity of reflected light incident onto the photo detector.

The reflected light was measured at intervals of 2 ns while light introduced into the photo detector is time-divided by the digital oscilloscope 20. The measurement starts 50 ns before incidence of the pulse light and continues for 100 ns after the pulse is generated. It may be impossible to obtain an accurate result in only one measuring cycle because reduction in S/N is caused by variations in performance of the laser and photo detector or by electrical noise. In order to solve this problem, 128 measuring cycles can be used to obtain an average of accumulated values.

FIG. 4A shows an example of change of refractive index of the variable refractive index film 9 in accordance with the intensity of the laser beam in the case where the variable refractive index film 9 is used as a single layer made of $Co_3O_4$. FIG. 4B shows an example of change of extinction coefficient of the variable refractive index film 9 in accordance with the intensity of the laser beam in the case where the variable refractive index film 9 is used as a single layer made of $Co_3O_4$. The wavelength of the laser beam is 405 nm. In each of FIGS. 4A and 4B, the abscissa axis indicates time. The laser pulse rises at a time point 0. When the laser pulse has not been generated yet, the intensity of light is 0.16 $GW/m^2$ and the refractive index at that time was 1.9.

The refractive index increases largely with increase in intensity of the laser pulse. When the laser pulse intensity is 8.2 $GW/m^2$, the refractive index becomes 2.7, that is, change of the refractive index became 42%. When the laser pulse intensity is 10 $GW/m^2$, the refractive index became about 2.1, that is, change of the refractive index became about 10.5%. The extinction coefficient also changes in accordance with change of the laser pulse intensity. That is, the extinction coefficient changes from 0.85 to 0.65, that is, the extinction coefficient decreases by about 24%. The response speed of the change of the refractive index is estimated to be not longer than a nanosecond on the basis of the rising speed of the laser intensity in accordance with the rising of the pulse shown in FIGS. 4A and 4B.

Figure 6:
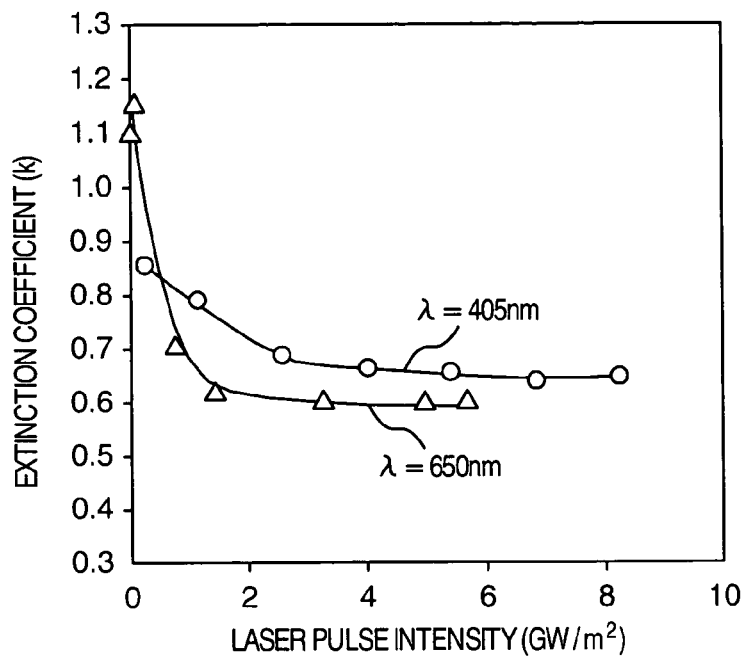
FIG. 6 is a graph showing the relation between laser pulse intensity and extinction coefficient shown in FIG. 4B.

FIG. 5 shows an example of the relation between the laser pulse intensity and the refractive index. FIG. 6 shows an example of the relation between the laser pulse intensity and the extinction coefficient. In each of FIGS. 5 and 6, there is also shown a result obtained in the case where a red laser beam having a wavelength of 650 nm is used in the system shown in FIG. 3 for performing measurement in the same manner as in FIGS. 4A and 4B. When the blue laser beam having a wavelength of 405 nm is used, the refractive index increases from 1.9 to 2.7 as shown in FIG. 4A. When the red laser beam having a wavelength of 650 nm is used, the refractive index however decreased from 3.3 to 3.0. On the other hand, the extinction coefficient decreases in both cases. That is, the extinction coefficient decreased from 0.85 to 0.65 in the case of 405 nm and decreases from 1.15 to 0.6 in the case of 650 nm.

As shown in FIG. 6, the extinction coefficient of the light-condensing function layer used in the present invention decreased regardless of whether the wavelength is 405 nm or 650 nm. As shown in FIG. 5, the refractive index increases in the case of irradiation with the blue laser beam having a wavelength of 405 nm whereas the refractive index decreases in the case of irradiation with the red laser beam having a wavelength of 650 nm. Change of the refractive index of this material is caused by a mechanism called "band filling effect".

Figure 7:
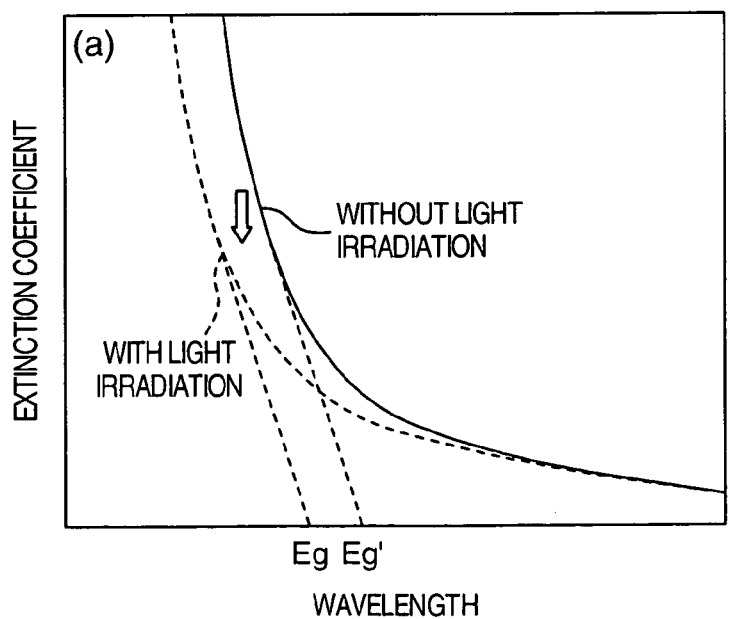
FIG. 7 is a graph showing wavelength dependence of the extinction coefficient of a light-condensing function layer used in the present invention.
Figure 8:
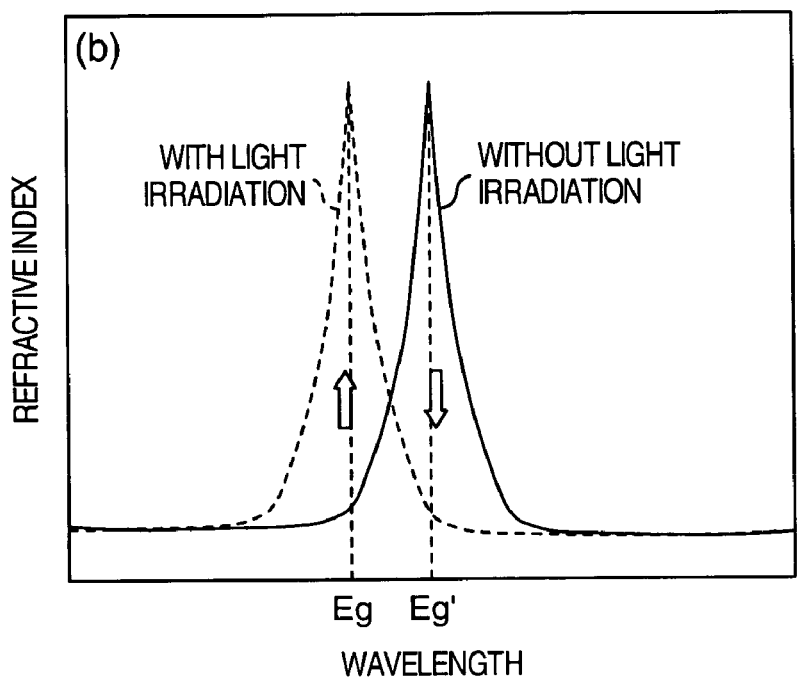
FIG. 8 is a graph showing wavelength dependence of the refractive index of the light-condensing function layer used in the present invention.

FIGS. 7 and 8 show graphs for explaining the band filling effect. FIG. 7 shows wavelength dependence of the extinction coefficient. FIG. 8 shows wavelength dependence of the refractive index. The $Co_3O_4$ thin film used in this embodiment has an optical band gap having energy just corresponding to the wavelength of 650 nm.

For this reason, when light with a wavelength shorter than 650 nm, that is, with higher energy is applied, electrons existing in a position corresponding to the band gap are excited by absorbing the light. Accordingly, as shown in FIG. 7, the extinction coefficient for light with a long wavelength is small while the extinction coefficient for light with a short wavelength is large.

When electrons are excited, electrons existing in a low energy level are excited gradually. On this occasion, electrons existing in a low energy level are excited to a higher energy level than the energy level reached by electrons excited initially. That is, it can be found that the energy of the band gap is higher than that of the electrons excited initially. For this reason, light having a long wavelength with low energy is not absorbed any more, so that the light absorption coefficient, that is, the extinction coefficient decreases. This tendency occurs in all wavelength regions, so that the extinction coefficient decreases for all wavelengths. In addition, because the light with lower energy is not absorbed any more, it can be said that light absorption is shifted toward the short wavelength side as a whole.

On the other hand, as shown in FIG. 8, the refractive index is calculated by use of the Kramers-Kronig relation of the extinction coefficient, so that there is a peak in the band gap energy. The wavelength dependence of the refractive index shifts according to the shift of the extinction coefficient on the short wavelength side. As a result, it is found that the refractive index decreases in a wavelength region near to the band gap but increases in a wavelength region shorter than the bang gap. That is, change of the refractive index caused by the band filling effect is made so that the extinction coefficient in all wavelength regions decreases with high intensity laser beam irradiation but the refractive index increases/decreases in accordance with the wavelength.

Figure 9:
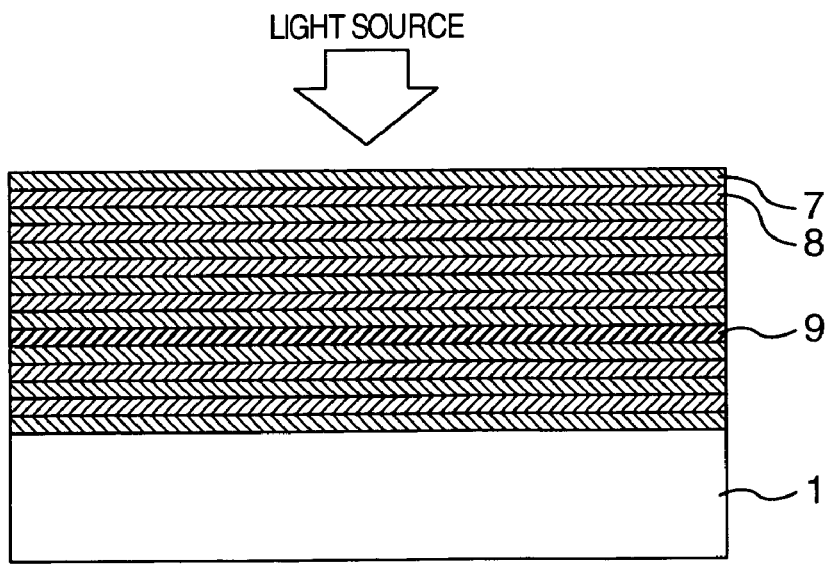
FIG. 9 is a typical sectional view of a dielectric multilayer reflecting layer produced in the present invention.

Only one thin film exhibiting change of its refractive index induced by laser beam irradiation as described above is formed in the laminated structure of low refractive index films and high refractive index films to thereby form a dielectric multilayer reflecting layer. In this condition, the reflecting property of the dielectric multilayer reflecting layer was evaluated. FIG. 9 is a typical sectional view of a multilayer structure produced for evaluation of this property. The multilayer structure shown in FIG. 9 has the same configuration as that of the dielectric multilayer reflecting layer in the optical recording medium shown in FIG. 1.

That is, since the refractive index of $SiO_2$ as the material of the low refractive index films 7 is 1.48, the film thickness of each low refractive index film 7 was selected to be 58 nm. Since the refractive index of $80ZnS-20SiO_2$ as the material of the high refractive index films 8 is 2.56, the film thickness of each high refractive index film 8 was selected to be 37 nm. The variable refractive index film 9 was made of cobalt oxide $Co_3O_4$ with a thickness of 70 nm. After the low refractive index films 7 and the high refractive index films 8 are laminated alternately, the variable refractive index film 9 was formed and the low refractive index films 7 and the high refractive index films 8 are further laminated alternately as nine layers.

Figure 10:
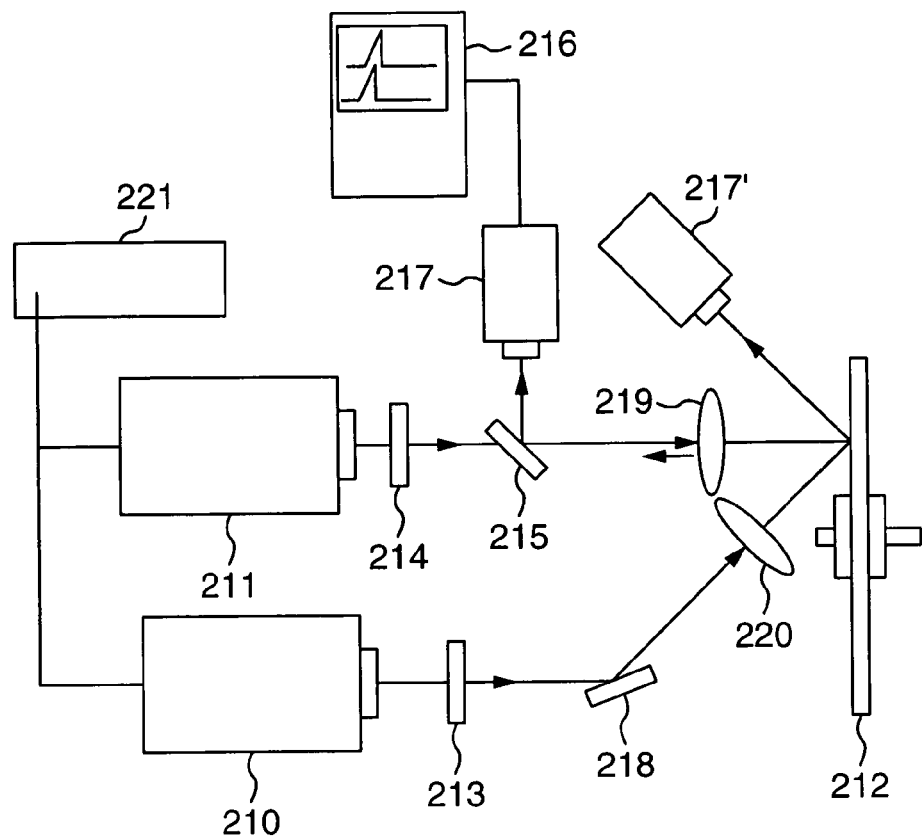
FIG. 10 is a typical view of an optical system in an apparatus for measuring transmittance in an excited state during laser beam irradiation.

Spectroscopic properties of the dielectric multilayer reflecting layer shown in FIG. 9 in a steady state and an excited state are evaluated. The spectroscopic properties are measured by the following method. FIG. 10 shows an optical system for this measurement. In FIG. 10, the reference numeral 210 designates an excitation light source (pump light); 211, a measurement light source (probe light); 212, a dielectric multilayer reflecting film formed on the substrate shown in FIG. 9; 213 or 214, an optical filter; 215, a half mirror (semi-transparent mirror); 216, a digital oscilloscope; 217 or 217', a photo detector; 218, a mirror; 219 or 220, a condensing lens; and 221, a delay generator.

In this embodiment, a YAG laser provided with an optical parametric oscillator (OPO) with a pulse width of 5 ns was used as each of the excitation light source 210 and the measurement light source 211. In order to synchronize the excitation light source and the signal light source with each other, a delay time of the delay generator 221 is controlled while signals output from the detectors 217 and 217' are supplied to the oscilloscope 216 and monitored. In this manner, the excitation light source 210 and the measurement light source 211 were synchronized with each other.

The condensing lenses 219 and 220 were used to narrow the respective laser beams to about 25 μmφ so that the beams were condensed on the surface of the sample. The intensity of the beam emitted from the light source 210 and the intensity of the beam emitted from the light source 211 were optimized for measurement. Specifically, the optical filters 213 and 214 were disposed to suppress damage of the sample. When the excitation light source 210 is turned on/off, the spectrum of light in the excited/steady state can be measured. Incidentally, spectral intensity of reflected light in the case where an Al film is formed was measured as a reference value in advance. The ratio of spectral intensity of reflected light in the case of formation of the dielectric multilayer laminated film to the reference value is calculated as reflectance.

The optical system was set up so that light emitted from the excitation light source does not enter the detector 217. The optical parametric oscillator (OPO) for changing the wavelength of light emitted from the measurement light source was operated by a personal computer to scan the wavelength in a range of from 380 nm to 440 nm to thereby measure the spectrum of the light.

Figure 11:
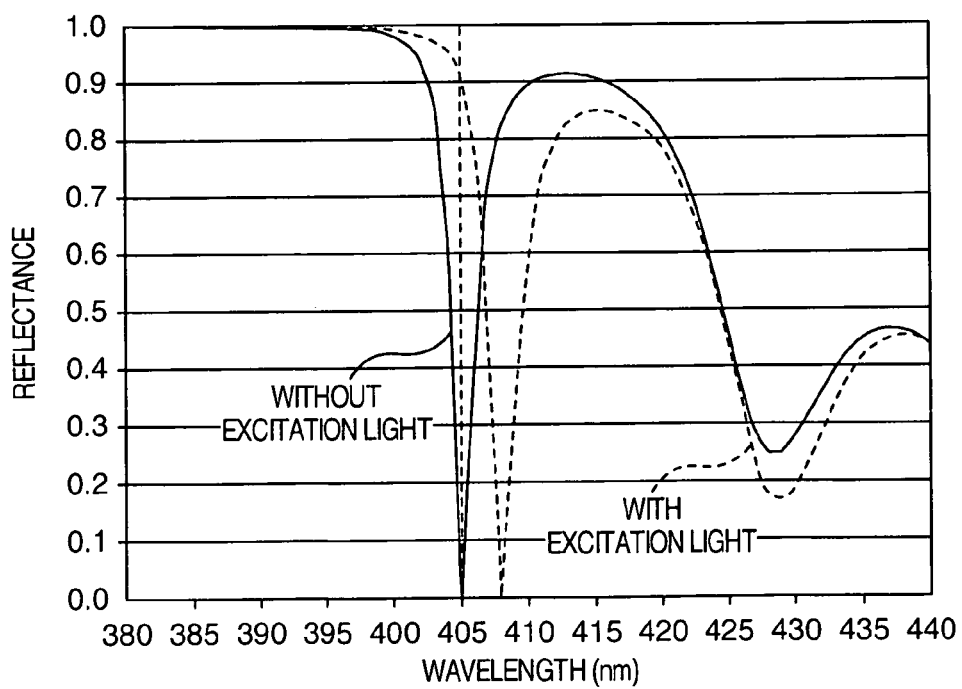
FIG. 11 is a graph showing change of reflectance of the dielectric multilayer reflecting layer produced in the present invention in accordance with whether excitation light is present or not.

FIG. 11 shows a reflectance spectrum of the dielectric multilayer reflecting layer shown in FIG. 9. When excitation light is not incident onto the dielectric multilayer reflecting layer, there is a sudden reflectance decrease portion at a wavelength of 405 nm. The value of reflectance at the wavelength of 405 nm was 0.005. On the other hand, when excitation light is incident onto the dielectric multilayer reflecting layer, the reflectance decrease portion shifted to about 410 nm because the wavelength spectrum as a whole shifts to the long wavelength side. On this occasion, the reflectance at the wavelength of 405 nm is about 0.9. That is, the value of reflectance was near 1.0. This change is conceived to occur as follows. That is, when the variable refractive index film is irradiated with the laser beam, the refractive index changes as shown in FIGS. 3, 4A, 4B and 5. Accordingly, the reflectance of the dielectric multilayer reflecting layer changes, so that the reflectance spectrum changes.

When respective optical constants are fitted in accordance with the structure shown in FIG. 11 by simulation, the refractive index of the variable refractive index film is 1.90 in a steady state in which the excitation light source 210 is not applied whereas the refractive index of the variable refractive index film is 1.95 in an excited state in which the excitation light source 210 is applied. That is, change of the refractive index was about 2%.

Figure 12:
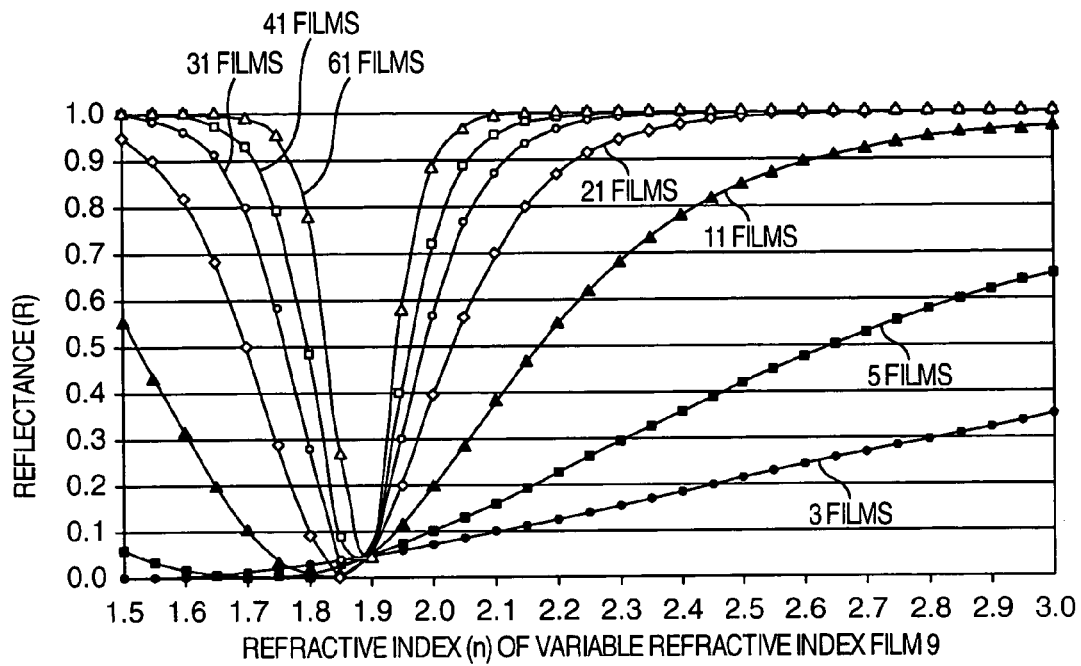
FIG. 12 is a graph showing change of reflectance due to change of refractive index of a variable refractive index film in the case where the cycle number of dielectric layers for forming the light-condensing function layer is changed.

Next, examination was made on the relation between the total number of the low refractive index films 7 and high refractive index films 8 constituting the dielectric multilayer reflecting layer and the change of reflectance of the variable refractive index film 9. FIG. 12 shows the relation between the reflectance of the dielectric multilayer reflecting layer and the refractive index of the variable refractive index film 9 in the case where the total number of laminated films inclusive of low refractive index films and high refractive index films is changed. Here, the total number of laminated films means the total number of low refractive index films and high refractive index films formed repetitively and a variable refractive index film. The three kinds of laminated films constitute the dielectric multilayer reflecting layer. In the recording medium according to the present invention, at least two units, particularly at least five units each made of a combination of a dielectric multilayer reflecting layer and a recording layer are formed on the substrate. Incidentally, an intermediate layer is inserted between adjacent ones of the units.

As shown in FIG. 12, when the total number of films is 3 and the refractive index of the variable refractive index film 9 is 1.9, the reflectance of the dielectric multilayer reflecting layer could be reduced to 0.05. When the refractive index of the variable refractive index film 9 changes to 2.7, the reflectance increases to 0.27. When the total number of films is 5, the reflectance changes from 0.05 to 0.52. In this case, a higher reflectance ratio was obtained compared with the case where the total number of films is 3.

Accordingly, increase in the total number of films from 3 to 5 can bring a larger change in reflectance in spite of the same change of refractive index. When the cycle number further increases to 21, the reflectance can change remarkably from about 0.05 to about 0.92 in accordance with change of the refractive index from 1.9 to 2.2. It is obvious from FIG. 12 that the more the number of laminated films is, the larger the change of reflectance is, even though change of the refractive index of the variable refractive index film 9 is small.

Figure 13:
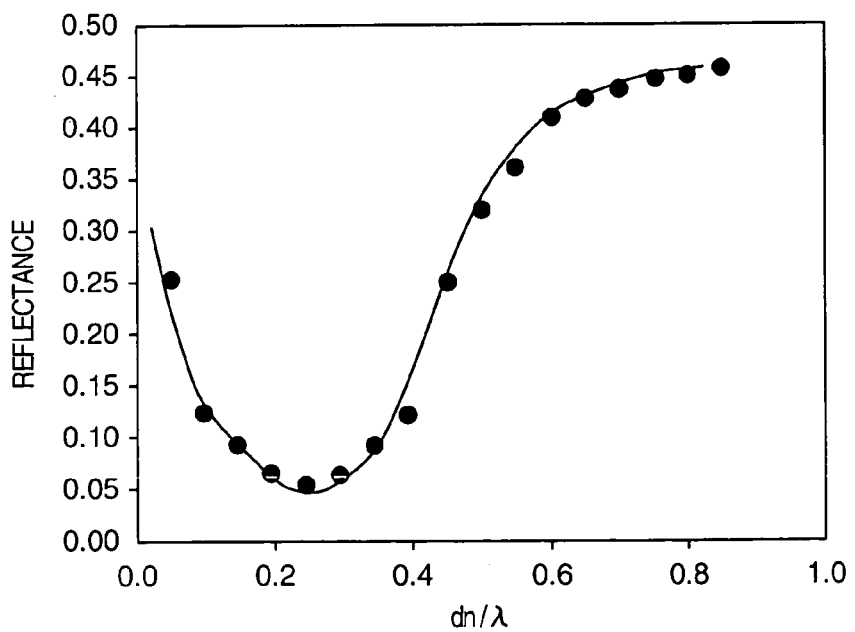
FIG. 13 is a graph showing change of reflectance in the case where dn/λ of each dielectric layer is changed.

Next, examination was made on change of reflectance due to change in film thickness of each low refractive index film 7 or each high refractive index film 8. FIG. 13 shows change of reflectance in accordance with the film thickness of each low refractive index film 7 or each high refractive index film 8 when the total number of films is 11. In FIG. 13, the rate $(dn/\lambda)$ of the product of film thickness (d) and refractive index (n) to wavelength $(\lambda)$ is plotted along the abscissa axis. As shown in FIG. 13, when $dn/\lambda$ is about 0.25, the reflectance can be reduced to about 0.05. When $dn/\lambda$ is displaced from 0.25, the reflectance becomes large. As a result, undesirably, the reflectance is not changed largely even when the refractive index is changed.

As shown in FIG. 13, when $dn/\lambda$ for each of the low refractive index film 7 and the high refractive index film 8 is in a range of from 0.15 to 0.35, both inclusively, reflectance of not higher than 0.10 was obtained desirably. On the other hand, when $dn/\lambda$ is smaller than 0.15 or larger than 0.35, the reflectance exceeds 0.10. Accordingly, it was undesirable that the reflectance cannot be changed largely. In brief, it is desirable that the film thickness of each of the low refractive index film 7 and the high refractive index film 8 is selected to satisfy the relation: $0.15 \leq dn/\lambda \leq 0.35$.

Next, various oxides for forming the variable refractive index film 9 were examined. Table 1 shows change of refractive index and change of reflectance of the dielectric multilayer reflecting layer produced by use of the variable refractive index film 9 according to the present embodiment. The wavelength of a laser beam is set at 405 nm, and the intensity of the laser beam was set at 1.0 $GW/m^2$. 80ZnS-20SiO$_2$ (containing 80% by mole of ZnS, and 20% by mole of SiO$_2$) is used as the material of the high refractive index films 8 and the film thickness of each high refractive index film 8 was set at 38 nm. SiO$_2$ is used as the material of the low refractive index films 7 and the film thickness of each low refractive index film 7 was set at 53 nm. The dielectric multilayer reflecting layer was produced as a laminate including the low refractive index films 7 and the high refractive index film 8. In each Example, the film thickness of the variable refractive index film 9 was selected to satisfy $dn/\lambda=0.25$. The total number of films was selected to be 31.

TABLE 1

| No. | Variable refractive index film 9 | $n_1$ | $k_1$ | $R_1$ | $n_2$ | $k_2$ |
|---|---|---|---|---|---|---|
| Example 1 | Co$_3$O$_4$ | 1.91 | 0.86 | 0.05 | 2.20 | 0.65 |
| Example 2 | Fe$_3$O$_4$ | 2.24 | 0.82 | 0.02 | 2.40 | 0.71 |
| Example 3 | Fe$_2$O$_3$ | 2.05 | 0.50 | 0.04 | 2.21 | 0.42 |
| Example 4 | NiO | 1.82 | 0.81 | 0.02 | 1.95 | 0.66 |
| Example 5 | V$_2$O$_5$ | 1.73 | 0.21 | 0.06 | 1.88 | 0.10 |
| Example 6 | ZnO | 1.81 | 0.22 | 0.07 | 1.87 | 0.15 |
| Example 7 | Cr$_2$O$_3$ | 1.95 | 0.41 | 0.08 | 2.12 | 0.33 |
| Example 8 | MnO$_2$ | 2.13 | 0.52 | 0.08 | 2.34 | 0.41 |
| Example 9 | CdS | 2.22 | 0.84 | 0.10 | 2.42 | 0.61 |
| Example 10 | Au—SiO$_2$ | 2.06 | 0.44 | 0.05 | 2.21 | 0.32 |
| Example 11 | Ag—SiO$_2$ | 2.34 | 0.45 | 0.06 | 2.51 | 0.34 |
| Example 12 | Cu—SiO$_2$ | 2.12 | 0.35 | 0.06 | 2.27 | 0.28 |
| Comparative Example 1 | SiO$_2$ | 1.46 | 0.01 | 0.06 | 1.48 | 0.01 |

| No. | Variable refractive index film 9 | $R_2$ | $\Delta n$ (%) | $\Delta k$ (%) | $\Delta R$ | Evaluation |
|---|---|---|---|---|---|---|
| Example 1 | Co$_3$O$_4$ | 0.98 | 15.18 | −24.42 | 0.93 | ◎ |
| Example 2 | Fe$_3$O$_4$ | 0.87 | 7.14 | −13.41 | 0.85 | ○ |
| Example 3 | Fe$_2$O$_3$ | 0.95 | 7.80 | −16.00 | 0.91 | ◎ |
| Example 4 | NiO | 0.85 | 7.14 | −18.52 | 0.83 | ○ |
| Example 5 | V$_2$O$_5$ | 0.95 | 8.67 | −52.38 | 0.89 | ○ |
| Example 6 | ZnO | 0.88 | 3.31 | −31.82 | 0.81 | ○ |
| Example 7 | Cr$_2$O$_3$ | 0.92 | 8.72 | −19.51 | 0.84 | ○ |
| Example 8 | MnO$_2$ | 0.89 | 9.86 | −21.15 | 0.81 | ○ |
| Example 9 | CdS | 0.90 | 9.01 | −27.38 | 0.80 | ○ |
| Example 10 | Au—SiO$_2$ | 0.92 | 7.28 | −27.27 | 0.87 | ○ |
| Example 11 | Ag—SiO$_2$ | 0.91 | 7.26 | −24.44 | 0.85 | ○ |
| Example 12 | Cu—SiO$_2$ | 0.88 | 7.08 | −20.00 | 0.82 | ○ |
| Comparative Example 1 | SiO$_2$ | 0.07 | 1.37 | 0.00 | 0.01 | X |

In Table 1, $n_1$, $k_1$, and $R_1$, are refractive index, extinction coefficient and reflectance measured with laser beam intensity of 0.16 $GW/m^2$ respectively, and $n_2$, $k_2$ and $R_2$ are refractive index, extinction coefficient and reflectance measured with laser beam intensity of 1.0 $GW/m^2$ respectively. Refractive index change $\Delta n$ and extinction coefficient change $\Delta k$ were obtained by the following expressions.

$$\Delta n = (n_2 - n_1)/n_1 \times 100$$

$$\Delta k = (k_2 - k_1)/k_1 \times 100$$

Reflectance difference ΔR was obtained by the following expression.

$$\Delta R = R_2 - R_1$$

In each column of evaluation, ⊚ is marked when the reflectance difference ΔR is not smaller than 0.9, ○ is marked when the reflectance difference ΔR is not smaller than 0.8 and smaller than 0.9, and X is marked when the reflectance difference ΔR is smaller than 0.8.

In each of Examples 1 to 9 shown in Table 1, there are used materials exhibiting change of refractive index in accordance with change of absorption induced by electron excitation and exhibiting decrease of extinction coefficient. Particularly, in each of Examples 1 to 8, there is shown a result of evaluation about a dielectric multilayer reflecting layer produced by use of a thin film of transition metal oxide as a variable refractive index film 9.

In Example 9, there is shown a result of evaluation in the case where a thin film of cadmium sulfide is used. In each of Examples 10 to 12, there is shown a result of evaluation in the case where a thin film formed by dispersing fine particles of gold, silver or copper into $SiO_2$ glass was used. In Comparative Example 1, there is shown a result of evaluation in the case where $SiO_2$ was used as the material of the variable refractive index film 9.

In Example 1 shown in Table 1 in which cobalt oxide $Co_3O_4$ is used, both change of refractive index and change of extinction coefficient are so large that a reflectance difference of 0.93 was obtained as a very good result. In Example 3 in which $Fe_2O_3$ was used, a reflectance difference of 0.91 was obtained as a good result.

In Example 2 or each of Examples 4 to 12 in which a glass thin film containing fine particles of oxide, CdS or metal dispersed therein is used, the refractive index change Δn is about 3% to about 9% and the reflectance difference was 0.80 to 0.89. In Comparative Example 1 in which $SiO_2$ is used, both refractive index and extinction coefficient are almost unchanged and the reflectance difference was obtained as a low value of 0.01 regardless of change in intensity of the laser beam.

As described above, when the dielectric multilayer reflecting layer was produced by use of a thin film material exhibiting a refractive index change of about 3%, a large reflectance change of not smaller than 80% can be obtained. Cobalt oxide or iron oxide is most preferred as the material exhibiting a large reflectance difference. It was also found that nickel oxide, vanadium oxide, chromium oxide, zinc oxide, manganese oxide or cadmium sulfide was preferred. When $SiO_2$ was used, a poor result was obtained because the refractive index little changes.

As described above, oxide or sulfide of a transition metal selected from the group consisting of Co, Fe, Ni, V, Mn, Cr, Zn and Cd is preferably used as the material of the variable refractive index (reflectance) film. Cobalt oxide or iron oxide is especially preferred. When cobalt oxide or iron oxide is used, a very large reflectance difference could be obtained.

Next, the relation between the total number of films and reflectance difference ΔR in the case where $Co_3O_4$ was used as the material of the variable refractive index film was examined by use of FIG. 11. In accordance with FIGS. 4A, 4B and 5, the refractive index of the variable refractive index film can change from 1.9 to 2.7. Under such a condition, a reflectance difference ΔR of 0.2 was obtained in a three-layer structure, a reflectance difference ΔR of 0.45 is obtained in a five-layer structure, and a reflectance difference ΔR of 0.9 is obtained in an eleven-layer structure. It was found that a larger reflectance difference ΔR can be obtained in spite of the same change in refractive index as the number of films increases.

Figure 20:
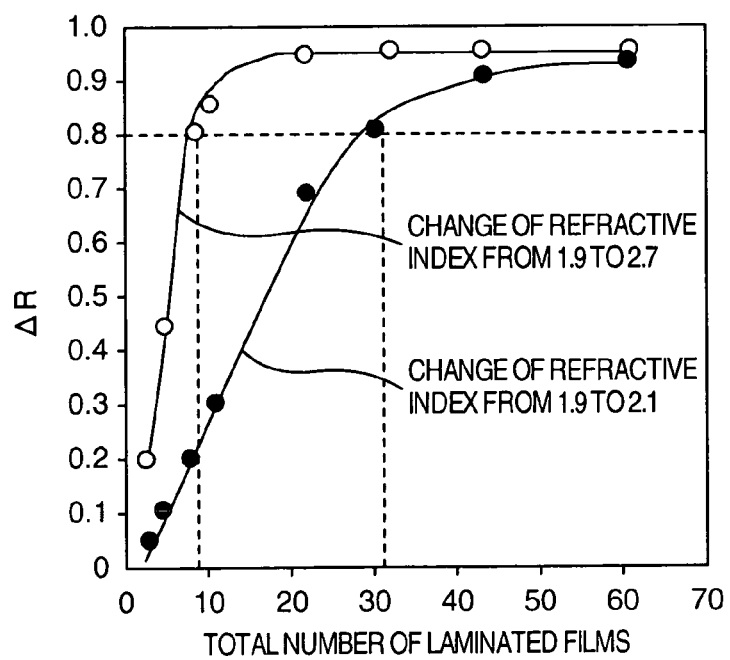
FIG. 20 is a graph showing reflectance difference ΔR in accordance with change of refractive index of the variable refractive index film in the case where the total number of laminated films is changed.

FIG. 20 shows reflectance difference ΔR in the case where the refractive index of the variable refractive index film 9 changes from 1.9 to 2.7. It is found that ΔR increases as the number of films increases, and that ΔR of not smaller than 0.8 was obtained when the number of films is not smaller than 9. Accordingly, it is preferable that the total number of laminated films is not smaller than 9.

Further, as shown in FIGS. 4A, 4B and 5, increase in refractive index of the variable refractive index film 9 is small when the laser beam irradiation power is low. Examination will be made on the case where a large reflectance difference is induced by such a small refractive index difference. As shown in FIGS. 4A, 4B and 5, when light with intensity of 0.1 $GW/m^2$ is applied, the refractive index of the variable refractive index film changes from 1.9 to 2.1, that is, by about 10%. FIG. 20 also shows reflectance differences ΔR obtained when the refractive index changes from 1.9 to 2.1. On this occasion, the reflectance difference ΔR changes to 0.65 in the case of a 21-layer structure, to 0.8 in the case of a 31-layer structure and to 0.90 in the case of a 41-layer structure. According to the curve shown in FIG. 20, the number of films is preferably selected to be not smaller than 31 in order to obtain ΔR large to be not smaller than 0.8 with a low refractive index.

Embodiment 2

Next, evaluation was made on recording/reproduction property of an optical disk having two optical recording layers shown in FIGS. 1 and 2 and provided with the aforementioned dielectric multilayer reflecting layers.

Figure 14:
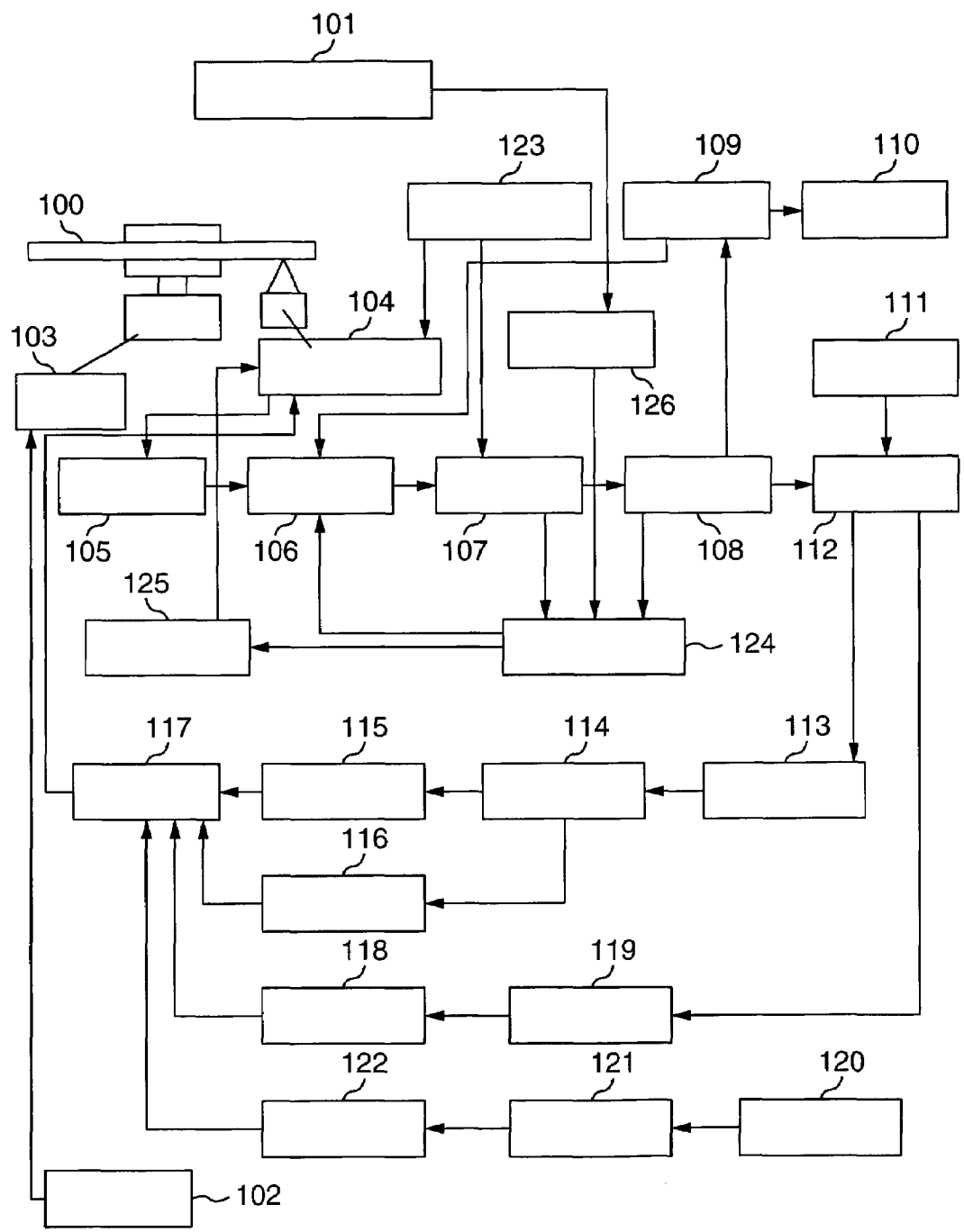
FIG. 14 is a block diagram of an optical information recording/reproduction device produced according to the present invention.

FIG. 14 is a block diagram of an optical information recording/reproduction device used in this embodiment. The device has a medium discriminating means 101 for discriminating the kind of an optical disk 100 as an optical recording medium. The optical disk is temporarily fixed to a rotary mechanism connected directly or indirectly to a rotary shaft of a motor 103 controlled by a motor circuit controlling means 102. A laser as a light source and a detection portion for detecting reflected light are provided in a pickup 104 so that information on the optical disk is read as an optical signal by the detection portion.

Information is recorded on the optical disk by the light source in the pickup. The pickup is positioned in a tracking direction by a pickup moving driver 123.

The optical signal is supplied to the outside of the device by a reproduction data sending means 110 via a preamplifier 105, a read signal processing means 106, an address reading means 107, a clock sync signal reading means 108 and a production signal demodulating means 109. Reproduction data is supplied to a predetermined output means such as a display device, a speaker, etc., or processed by an information processor such as a personal computer.

In this embodiment, a laser selecting means 111 for selecting a desirable laser wavelength is provided in addition to a circuit system used for ordinary recording/reproduction. Peak power to be used is decided by a peak power deciding means 113 in accordance with a signal output from the laser selecting means and on the basis of analysis by a laser power control information analyzing means 112. Similarly, reading power is decided by a reading power deciding means 119.

A signal output from the peak power deciding means 113 is supplied to a laser driver 117 through a power ratio deciding means 114 via a recording power DC amplifier 115 and an erasing power DC amplifier 116 to control the light source in the pickup. Similarly, a signal output from the reading power deciding means 119 is supplied to the laser driver 117 via a reading power DC amplifier 118 to control the light source in the pickup. A semiconductor laser with a wavelength of 405 nm/650 nm was used as an actual laser device.

Since the optical information recording medium according to the present invention has a multilayer structure, both focal point and focal depth vary in accordance with the recording layer from/in which information should be read/written. Accordingly, the device was provided as a structure in which an auto focusing mechanism can be operated in accordance with selection of an optical recording layer. In addition, in the multilayer recording medium according to the present invention, fluctuation of reflectance caused by tilting of the disk is larger than that of a background-art optical recording medium. It is therefore necessary to correct the error.

Accordingly, a disk tilting detector was formed in the auto focusing mechanism. There was also provided a mechanism for adjusting the angle of the pickup on the basis of information of a signal output from the disk tilting detector so that a laser beam emitted from the optical pickup can be applied always perpendicularly on the optical disk. Accordingly, because the laser beam can be incident always perpendicularly onto the optical disk regardless of tilting of the medium, an optical information recording device little in fluctuation of reflectance could be formed.

In a tracking error detecting means 126, a section for high-density recording could be provided separately so that tracking can be performed in accordance with the medium. Information output from the tracking error detecting means 126 is transmitted to the pickup through a controller 124 and a pickup control circuit 125. A medium kind discrimination mechanism for discriminating the kind of the medium by using a reflectance difference of the medium was provided so that auto tracking can be performed in accordance with various kinds of media.

For data recording, recording data is supplied from a recording data receiving means 120 to a recording data modulating means 121. The recording data is modulated by the recording data modulating means 121 and supplied to the laser driver through a recording timing correcting means 122 to control the light source in the pickup.

When the configuration shown in FIG. 14 is used, not only multilayer optical recording media can be used with good compatibility but also disks different in recording capacity because of increase in amount of data can be handled by one system. Incidentally, the configuration of the optical information reproduction/recording device used may be modified suitably in accordance with the purpose and application.

In each of Examples 13 to 17 according to this embodiment, a $Co_3O_4$ thin film was used as the variable refractive index film 9. In each of Examples 13 to 17, the number of laminated films inclusive of low refractive index films and high refractive index films constituting the dielectric multilayer reflecting layer was selected to be in the range of from 3 to 61.

In Comparative Example 2, a two-layer recording medium including ordinary metal reflecting layers as reflective layers in place of the multilayer reflecting layers according to Examples 13 to 17 was produced. A silver alloy is used as the material of the metal reflecting layers. The film thickness of a lower part of the first layer was set at 20 nm. The film thickness of a lower part of the second layer was set at 100 nm. In the layers, repetitive recording marks with a mark length of 0.149 μm are written. The S/N of a signal obtained from the recording marks was evaluated.

Figure 15:
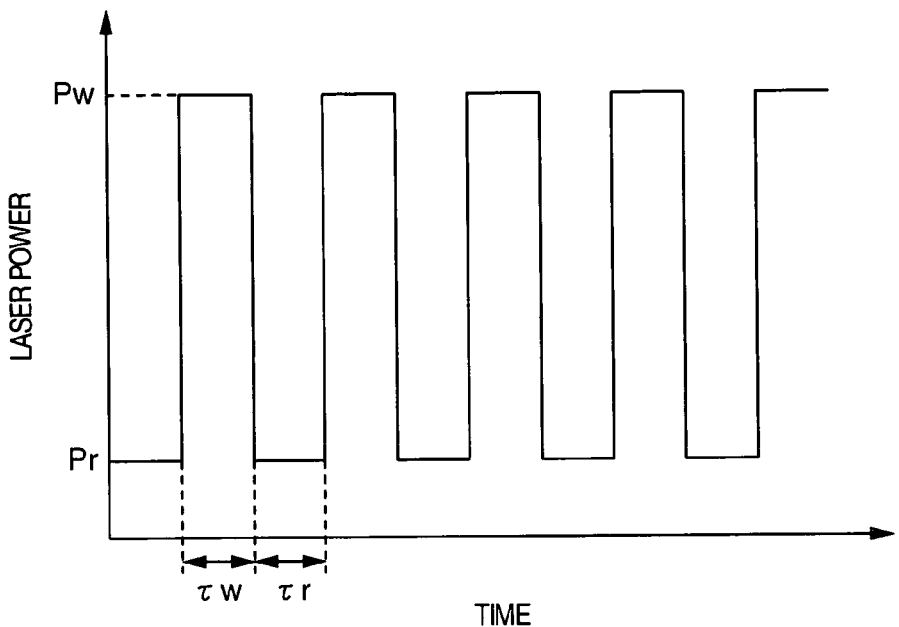
FIG. 15 is a graph showing recording strategy at the time of recording.

The linear speed of disk rotation was set at 10 m/s. FIG. 15 shows recording strategy at the time of recording. In FIG. 15, the abscissa axis indicates time, the ordinate axis indicates laser power, Pw is recording power, Pr is reproduction power, τw is writing time, and τr is non-writing time. In each of Examples 13 to 17, recording is performed at predetermined mark intervals in the condition that τw is set to be equal to τr. After the writing, continuous light with intensity Pr is applied so that a quantity of reflected light is read. In this condition, the S/N ratio of signal to noise was evaluated.

Table 2 shows the total number of laminated films inclusive of low refractive index films and high refractive index films in the two-layer recording medium having two dielectric multilayer reflecting layers each having a variable refractive index film and produced in each of Examples 13 to 17. Table 2 also shows reflectance difference ΔR in the case where the refractive index of the variable refractive index film 9 changes from 1.9 to 2.1, that is, by 10%.

TABLE 2

|  | Total number of laminated films in dielectric multilayer reflecting layers | Reflectance difference ΔR |
| --- | --- | --- |
| Example 13 | 61 | 0.9 |
| Example 14 | 31 | 0.8 |
| Example 15 | 21 | 0.7 |
| Example 16 | 11 | 0.3 |
| Example 17 | 3 | 0.1 |
| Comparative Example 2 | (Ag reflecting films) | — |

Figure 16:
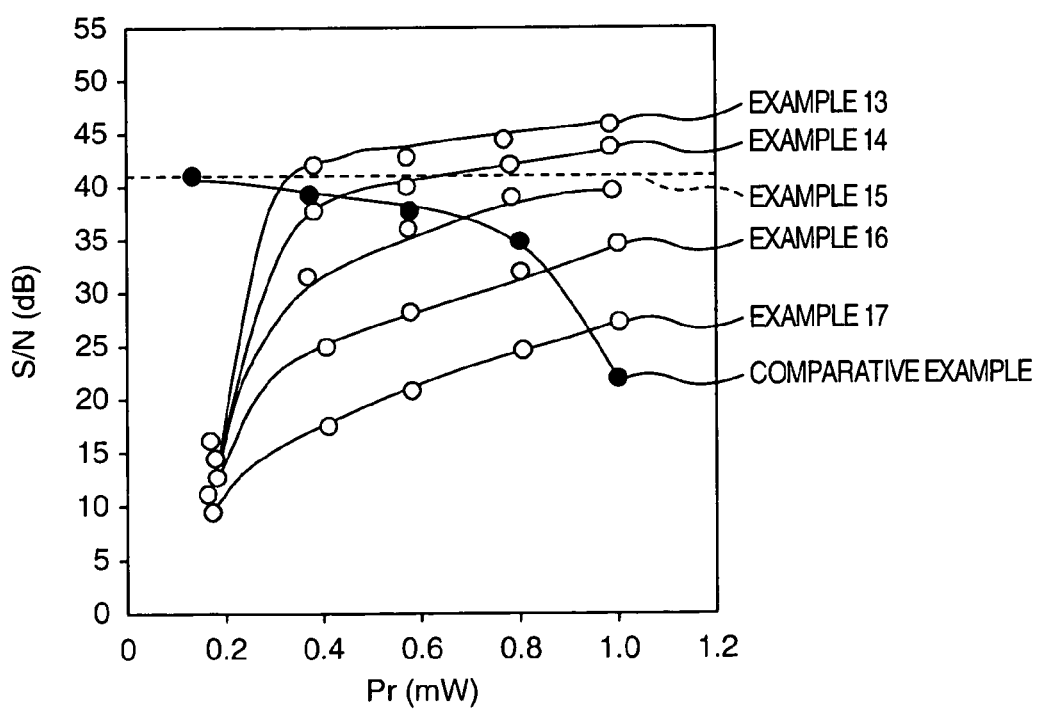
FIG. 16 is a graph showing change of S/N versus reproduction power for a first layer of the two-layer optical recording medium produced according to the present invention.

From the relation between the total number of laminated films and reflectance difference ΔR as shown in FIG. 20, the reflectance difference ΔR is 0.9 when the total number of laminated films is 61, the reflectance difference ΔR is 0.8 when the total number of laminated films is 31, the reflectance difference ΔR is 0.7 when the total number of laminated films is 21, the reflectance difference ΔR is 0.3 when the total number of laminated films is 11, and the reflectance difference ΔR is 0.1 when the total number of laminated films is 5. First, recording is performed on the first recording layer in the condition that Pw is fixed to 5 mW. While reproduction power Pr at the time of reproduction is selected to be in a range of from 0.1 mW to 1.0 mW, the S/N was plotted. FIG. 16 shows a result of the plotting. In Examples 13 to 17, the S/N was improved as the total number of laminated films increases.

It is also found that the S/N is improved as the reading power increases. When the reproduction power is set at 1.0 mW, a value of satisfactory S/N higher than 40 dB could be obtained in the case where the number of laminated films is not smaller than 31. Accordingly, it is preferable that the total number of laminated films is not smaller than 31 and ΔR is not smaller than 0.8.

As shown in FIG. 11, in this embodiment, it is conceived that when laser power is so low that the refractive index of the variable refractive index film little changes, satisfactory S/N cannot be obtained on the low power side because reflectance is low and transmittance is high. It is conceived that when the number of laminated films is small, satisfactory S/N cannot be obtained because change of reflectance is small in spite of increase in reproduction power.

On the other hand, it is conceived that when the number of laminated films is increased, S/N becomes better and better because reflectance increases rapidly as reproduction power increases. Particularly, when the number of films is 61, satisfactory S/N was obtained at about 0.2 mW, desirably. When the total number of laminated films was 31, S/N of 40 dB as a sufficiently high value for practical use was obtained at reproduction power of 1.0 mW. When the total number of laminated films was smaller than 31, it was necessary to increase reproduction power. In Comparative Example 2, a phenomenon that S/N decreases far from increasing when reproduction power increases is observed. It is conceived that this phenomenon occurs because crosstalk from the second recording layer is generated when reproduction power increases.

Figure 17:
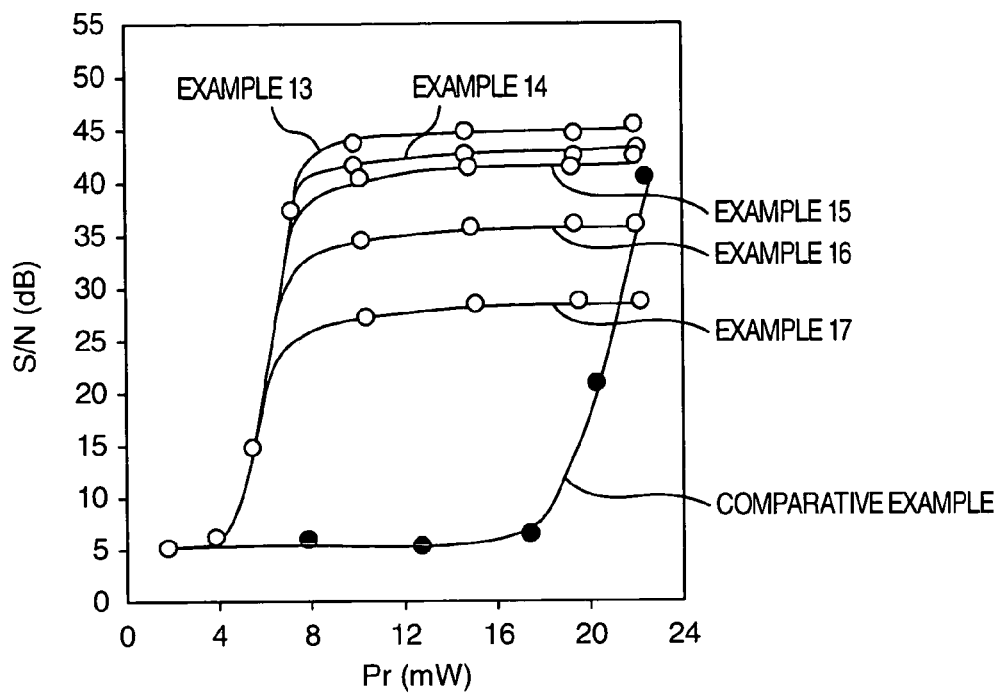
FIG. 17 is a graph showing change of S/N versus recording power for a second layer of the two-layer optical recording medium produced according to the present invention.

Next, recording/reproduction property of the second recording layer will be evaluated. First, in order to evaluate recording power dependence, recording was performed in the condition that the recording focal point is adjusted on the second layer while recording power Pw is selected to be in a range of from 2 mW to 22 mW. Then, in the condition that reproduction power is fixed to 1 mW, evaluation is performed. In Comparative Example 2, reading is performed at 4 mW because it is impossible to read information from the second layer at 1 mW. FIG. 17 shows a result of evaluation.

In Examples 13 to 17 in which the dielectric multilayer reflecting layers are formed, S/N begins to increase when recording power is in a range of from 5 mW to 6 mW. Accordingly, it was found that recording is performed. The recording power is substantially equal to 5 mW which is recording power used in the recording/reproduction test for the first layer as shown in FIG. 16. This indicates that light reaches the second recording layer without loss of light in the first recording layer.

On the other hand, in Comparative Example 2, recording was performed suddenly when reproduction power exceeds 20 mW. This indicates that such a large quantity of light is required because a large part of light is absorbed to the first layer so that the quantity of light allowed to reach the second layer is small.

In Examples 13 to 17, it is conceived that recording could be performed at low power because transmittance of the dielectric multilayer reflecting layer under the first layer is high. S/N at the time of reading however decreased as the total number of laminated films in the reflecting layer decreases. It is conceived that S/N decreased because reading power is 1 mW and because reflectance at the time of reading is low in Examples in which the total number of laminated films is small.

As described above, it was found that both recording/reproduction of information in/from the first and second layers in the optical disk using the dielectric multilayer reflecting layers can be made at very low power almost equal to that for the background-art optical disk. In addition, information can be read with higher S/N as the total number of laminated films increases. Particularly, when the total number of laminated films is not smaller than 31, good S/N could be obtained.

Although the embodiments have been described on the case where the optical information recording medium has two optical information recording layers, a similar test could be performed on optical information recording media which are produced by film-forming apparatuses shown in FIGS. 18 and 19 so that the number of laminated recording layers is increased to 3, 4, 5 and 6. As a result of the test, there is observed a phenomenon that S/N of a recording layer in a deep position with respect to the direction of incidence of the laser beam deteriorates as the number of recording layers increases. When the number of recording layers was not smaller than 11, S/N of 40 dB or higher could not obtained in the recording/reproduction test with a mark length of 0.149 μm. Accordingly, it was preferable that the number of recording layers is not larger than 10.

The film thickness of the intermediate layer was examined. In this embodiment, the film thickness of the intermediate layer was selected to be in a range of from 0.3 μm to 3 μm. If the film thickness of the intermediate layer is smaller than 0.3 μm, adjacent two recording layers are present in a laser focal depth. As a result, the two recording layers are heated to a high temperature, so that recording is performed on the two recording layers, undesirably. When the film thickness of the intermediate layer is not smaller than 0.3 μm, the two recording layers are not present in a focal depth. As a result, recording could be performed on one single recording layer, desirably.

If the thickness of the intermediate layer is not smaller than 3 μm, a great deal of time is required for formation of the intermediate layer. As a result, it was impossible to keep production efficiency high, undesirably. Also undesirably, when the number of recording layers is increased, there is a possibility that the laser pickup may physically collide with the upper cover layer of the optical disk when information is read/written from/in a deeper recording layer.

According to the above examination, it was preferable that the film thickness of the intermediate layer is selected to be in a range of from 0.3 μm to 3.0 μm, both inclusively.

When an optical information recording medium having dielectric multilayer reflecting layers according to the present invention is used, a multilayer optical recording medium recordable/reproducible with high S/N and at low power of laser intensity can be obtained. An optical disk little in crosstalk among layers can be also obtained. Because the film thickness of an intermediate layer between two adjacent layers can be reduced, a vacuum process can be used for forming all the films. In addition, because the optical information recording/reproduction device for reproducing the optical information recording medium having the dielectric multilayer reflecting layers according to the present invention has a mechanism for changing the angle of the pickup by detecting tilting of the disk, reading can be made at stable reflectance.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An optical information recording medium comprising a substrate, a plurality of optical information recording layer units formed as a set of layers stacked on said substrate with interposition of a transparent intermediate layer between adjacent ones of said optical information recording layer units, each of said optical information recording layer units including an optical recording layer for recording an optical signal, a plurality of dielectric multilayer reflecting layers laminated on said optical recording layer, and a variable refractive index thin film formed as a layer stacked within said dielectric multilayer reflecting layers and exhibiting a nonlinear and reversible change of its complex refractive index induced by light irradiation, wherein each of said dielectric multilayer reflecting layers is formed as a repetitive and alternate laminate of both low refractive index thin films and high refractive index thin films successively stacked toward the substrate, wherein said intermediate layer has a film thickness of 0.3 μm to 3 μm.

2. An optical information recording medium according to claim 1, wherein reflectance of a portion of an optical information recording layer unit used for reading/writing information by condensed laser beam irradiation is higher than that of an other portion of said optical information recording layer unit, and wherein said intermediate layer is made of an amorphous dielectric thin film.

3. An optical information recording medium according to claim 1, wherein the number of said units is 2 to 10.

4. An optical information recording medium according to claim 1, wherein the total number of said low refractive index thin films, said high refractive index thin films and said variable refractive index thin film in each of said units is 9 to 20.

5. An optical information recording medium according to claim 2, wherein said dielectric multilayer reflecting layer formed in each of said information recording layer units is provided so that a reflectance difference $\Delta R$ $(=R_2-R_1)$ between reflectance $R_2$ of a portion used for reading/writing information by condensed laser beam irradiation and reflectance $R_1$ of the other portion is not smaller than 0.8.

6. An optical information recording medium according to claim 1, wherein each of said dielectric multilayer reflecting layers is formed so that the ratio $n_1/n_2$ of the refractive index $n_1$ of each low refractive index thin film to the refractive index $n_2$ of each high refractive index thin film is not higher than 0.80, and that the product nd of refractive index n and film thickness d of each refractive index thin film is in a range of from 0.15 times to 0.35 times as large as the wavelength of the laser beam used for reading/writing information.

7. An optical information recording medium according to claim 1, wherein: said variable refractive index thin film in each of said dielectric multilayer reflecting layers is a thin film containing particles of at least one element selected from the group consisting of Co, Fe, Ni, V, Mn, Cr, Cd, Zn, Cu, Ag, Pt and Au, or particles of oxide, nitride or sulfide of said selected element; said low refractive index thin films are thin films made of $SiO_2$, and said high refractive index thin films are thin films made of at least one member selected from the group consisting of $TiO_2$, $ZnS-SiO_2$, $Si_3N_4$ and $Ta_2O_5$.

8. An optical information recording medium comprising a substrate, and a plurality of optical information recording layer units formed on said substrate with interposition of transparent intermediate layer, each of said optical information recording layer units including an optical recording layer for recording an optical signal, and a dielectric multilayer reflecting layer laminated on said optical recording layer directly or through another film, wherein each of said dielectric multilayer reflecting layers has a dielectric multilayer film formed as a repetitive laminate of low refractive index thin films and high refractive index thin films; and a variable refractive index thin film formed in said dielectric multilayer film and exhibiting nonlinear change of its complex refractive index induced by light irradiation, and wherein said intermediate layer is made of an amorphous dielectric thin film having a film thickness of from 0.3 μm to 3 μm, both inclusively.

9. An optical information recording device comprising an optical information recording medium, a pickup for reading/writing optical information from/in said optical information recording medium, and a spindle motor for giving rotation drive to said optical information recording medium while supporting said optical information recording medium, said optical information recording medium including a substrate, a plurality of optical information recording layer units formed as a set of layers stacked on said substrate with interposition of a transparent intermediate layer between adjacent ones of said optical information recording layer units, each of said optical information recording layer units having an optical recording layer for recording an optical signal, a plurality of dielectric multilayer reflecting layers laminated on said optical recording layer, and a variable refractive index thin film formed as a layer stacked within said dielectric multilayer reflecting layers and exhibiting a nonlinear and reversible change of its complex refractive index induced by light irradiation, wherein each of said dielectric multilayer reflecting layers is formed as a repetitive and alternate laminate of both low refractive index thin films and high refractive index thin films successively stacked toward the substrate, wherein said pickup includes an auto focusing mechanism, and a laser beam irradiation angle keeping mechanism which is used together with said auto focusing mechanism so that an optical axis of a laser beam emitted from said pickup can be automatically kept substantially perpendicular to said optical information recording medium when said optical information recording medium tilts, wherein said intermediate layer has a film thickness from 0.3 μm to 3 μm.

10. An optical information recording device according to claim 9, wherein said laser beam irradiation angle keeping mechanism receives an input signal for indicating an intensity distribution of said laser beam and controls the angle of said pickup in accordance with said input signal to thereby keep the laser beam irradiation angle constant.

11. An optical information recording device according to claim 9, wherein said optical information recording medium is formed so that reflectance of a portion of an optical information recording layer unit used for reading/writing information by condensed laser beam irradiation is higher than that of an other portion of said optical information recording layer unit, and wherein said intermediate layer is made of an amorphous dielectric thin film.

12. An optical information recording device according to claim 9, wherein the number of said units in said optical information recording medium is 2 to 10.

13. An optical information recording device according to claim 9, wherein the total number of said low refractive index thin films, said high refractive index thin films and said variable refractive index thin film in each of said units in said optical information recording medium is 9 to 20.

14. An optical information recording device according to claim 9, wherein said dielectric multilayer reflecting layer formed in each of said information recording layer units in said optical information recording medium is provided so that a reflectance difference $\Delta R$ $(=R_2-R_1)$ between reflectance $R_2$ of a portion used for reading/writing information by condensed laser beam irradiation and reflectance $R_1$ of the other portion is not smaller than 0.8.

15. An optical information recording device according to claim 9, wherein each of said dielectric multilayer reflecting layers in said optical information recording medium is formed so that the ratio $n_1/n_2$ of the refractive index $n_1$ of each low refractive index thin film to the refractive index $n_2$ of each high refractive index thin film is not higher than 0.80, and that the product nd of refractive index n and film thickness d of each refractive index thin film is in a range of from 0.15 times to 0.35 times as large as the wavelength of the laser beam used for reading/writing information.

16. An optical information recording device according to claim 9, wherein: said variable refractive index thin film in each of said dielectric multilayer reflecting layers in said optical information recording medium is a thin film containing particles of at least one element selected from the group consisting of Co, Fe, Ni, V, Mn, Cr, Cd, Zn, Cu, Ag, Pt and Au, or particles of oxide, nitride or sulfide of said selected element; said low refractive index thin films are thin films made of $SiO_2$; and said high refractive index thin films are thin films made of at least one member selected from the group consisting of $TiO_2$, $ZnS$—$SiO_2$, $Si_3N_4$ and $Ta_2O_5$.

17. An optical information recording device comprising an optical information recording medium, a pickup for reading/writing optical information from/in said optical information recording medium, and a spindle motor for giving rotation drive to said optical information recording medium while supporting said optical information recording medium, said optical information recording medium including a substrate, and a plurality of optical information recording layer units formed on said substrate with interposition of transparent intermediate layer, each of said optical information recording layer units having an optical recording layer for recording an optical signal, and a dielectric multilayer reflecting layer laminated on said optical recording layer directly or through another film, each of said dielectric multilayer reflecting layers having a dielectric multilayer film formed as a repetitive laminate of low refractive index thin films and high refractive index thin films, and a variable refractive index thin film formed in said dielectric multilayer film and exhibiting nonlinear change of its complex refractive index induced by light irradiation, wherein said pickup includes an auto focusing mechanism, and a laser beam irradiation angle keeping mechanism which is used together with said auto focusing mechanism so that an optical axis of a laser beam emitted from said pickup can be automatically kept substantially perpendicular to said optical information recording medium when said optical information recording medium tilts, and wherein said intermediate layer in said optical information recording medium is made of an amorphous dielectric thin film having a film thickness of 0.3 μm to 3 μm.

18. An optical information recording medium according to claim 1, wherein said dielectric multilayer reflecting layer formed in each of said information recording layer units is provided so that a reflectance difference $\Delta R$ ($=R_2-R_1$) between reflectance $R_2$ of a portion used for reading/writing information by condensed laser beam irradiation and reflectance $R_1$ of the other portion is not smaller than 0.8.

* * * * *